(12) United States Patent
Kurauchi

(10) Patent No.: US 7,533,405 B2
(45) Date of Patent: May 12, 2009

(54) NONLINEAR BROADCAST SYSTEM

(75) Inventor: Nobukazu Kurauchi, Nagoya (JP)

(73) Assignee: Panasonic Corporation, Osaka (JP)

( * ) Notice: Subject to any disclaimer, the term of this patent is extended or adjusted under 35 U.S.C. 154(b) by 1931 days.

(21) Appl. No.: 09/938,742

(22) Filed: Aug. 24, 2001

(65) Prior Publication Data
US 2002/0059625 A1      May 16, 2002

(30) Foreign Application Priority Data
Aug. 30, 2000  (JP)  .............................. 2000-261912

(51) Int. Cl.
*H04N 7/173* (2006.01)
(52) U.S. Cl. .................... 725/95; 725/87; 725/91; 725/93; 725/96
(58) Field of Classification Search ............ 725/87, 725/91, 93, 95, 96
See application file for complete search history.

(56) References Cited

U.S. PATENT DOCUMENTS 6,460,018 B1 * 10/2002 Kasai et al. .................... 705/8
6,571,351 B1 * 5/2003 Mitaru et al. .................. 714/6
6,718,552 B1 * 4/2004 Goode .......................... 725/95
6,986,156 B1 * 1/2006 Rodriguez et al. ............ 725/95

FOREIGN PATENT DOCUMENTS

| EP | 1065816 | 1/2001 |
| JP | 11261510 | 9/1999 |

* cited by examiner

Primary Examiner—Brian T Pendleton
Assistant Examiner—Nnenna N Ekpo

(57) ABSTRACT

A nonlinear broadcast system with improved entire resource utilization efficiency gives priority to securing hardware resources for broadcast, for preventing broadcast accidents. A hardware resource management unit determines resource allocation at reproduction start time and reproduction end time of each video data, based on a time schedule of an editing list in a HDD for reproducing plurality of video data. A hardware resource amount such as bandwidth for access to the hard disc is made varied to minimize an allocation amount to each video data. Suppose one video data transfer from the HDD for reproduction requires bandwidth 60 Mbps. In a duration where one video data is reproduced, bandwidth 60 Mpbs is secured, while in a duration where two video data are mixed and reproduced, bandwidth 120 Mbps is secured. To background processing such as network material transfer, allocation is performed by fully utilizing the remaining hardware resource after the allocation for reproduction.

21 Claims, 18 Drawing Sheets

FIG.5

| EDITING LIST No. | TRACK | MATERIAL ID | IN-POINT | OUT-POINT | DURATION |
|---|---|---|---|---|---|
| 5001 | A/B ROLL | CUT 1 | 18:00:00:00 | 18:04:29:29 | 00:04:30:00 |
| | | CUT 2 | 18:04:00:00 | 18:08:59:29 | 00:05:00:00 |
| | | CUT 3 | 18:08:30:00 | 18:13:59:29 | 00:05:30:00 |
| | KEY | CUT 4 | 18:10:30:00 | 18:11:59:29 | 00:01:30:00 |

| RESOURCE ID 7001 | MAXIMUM VALUE 7002 | EDITING LIST No. 7003 | MATERIAL ID 7004 | OCCUPANCY 7005 | IN-POINT 7006 | OUT-POINT 7007 | DURATION 7008 |
|---|---|---|---|---|---|---|---|
| LOCAL HDD BAND | 200Mbps | 5001 | CUT 1 | 60Mbps | 18:00:00:00 | 18:04:29:29 | 00:04:30:00 |
| | | | CUT 2 | 60Mbps | 18:04:00:00 | 18:08:59:29 | 00:05:00:00 |
| | | | CUT 3 | 60Mbps | 18:08:30:00 | 18:13:59:29 | 00:05:30:00 |
| | | | CUT 4 | 60Mbps | 18:10:30:00 | 18:11:59:29 | 00:01:30:00 |

FIG.9

| ALLOCATION TIME 8001 | RESOURCE ID 8002 | TIMER ID 8003 | ALLOCATION TYPE 8004 | TOTAL OCCUPANCY 8005 |
|---|---|---|---|---|
| 18:00:00:00 | LOCAL HDD BAND | CUT 1 | In | 60Mbps |
| 18:04:00:00 | | CUT 2 | In | 120Mbps |
| 18:04:30:00 | | CUT 1 | Out | 60Mbps |
| 18:08:30:00 | | CUT 3 | In | 120Mbps |
| 18:09:00:00 | | CUT 2 | Out | 60Mbps |
| 18:10:30:00 | | CUT 4 | In | 120Mbps |
| 18:12:00:00 | | CUT 4 | Out | 60Mbps |
| 18:14:00:00 | | CUT 3 | Out | 0Mbps |

8000

NONLINEAR BROADCAST SYSTEM

BACKGROUND OF THE INVENTION (1) Field of the Invention

The present invention relates to a broadcast system, and more particularly to a technique for allocating hardware resources to processings such as editing and broadcasting in a broadcast system where material data is written to a randomly accessible recording medium, edited, and broadcasted.

(2) Description of the Prior Art

A nonlinear broadcast system has increasingly been employed as a broadcast system for programs in recent years. In the nonlinear broadcast system, material data such as video that makes up the contents of broadcast programs is stored in a randomly accessible recording medium such as a hard disc, instead of a linear access device such as a video tape recorder (VTR) that does not allow an immediate access to specific data, the programs are edited quickly using a so-called nonlinear editing device, and the edited programs are broadcasted. The nonlinear broadcast system is particularly effective in editing and broadcasting up-to-the-minute news programs and sports relay programs.

In the nonlinear broadcast system, material data needs to be transferred from a hard disc or the like at a fixed transfer rate for broadcast. Otherwise, broadcast accidents such as frame-drop may happen.

The hard disc or the like is accessed for various purposes as follows. It may be accessed to store material data that has been collected for programs, to manipulate once stored material data, and to read material data for broadcast. To prevent the broadcast accidents from happening, therefore, bandwidth management relating to such accesses to the hard disc or the like needs to be performed.

In the nonlinear broadcast system capable of transmitting two sets of video data in a mixed state for realizing a so-called picture-in-picture function and a function of switching videos seamlessly, the two sets of video data that have been compressed and respectively stored in hard discs or the like are read out in parallel, transferred to CODECs (coder-decoder) where they are decompressed, and transmitted in a mixed state for broadcast.

To prevent the broadcast accidents from happening in such a nonlinear broadcast system, an enough bandwidth for transferring the two sets of video data from the hard discs or the like to the CODECs needs to be secured. Suppose that a bandwidth of 60 Mbps is required for reproducing each set of video data in real time. To broadcast a program, data transfer from the hard discs or the like needs to be performed with securing a bandwidth of 120 Mbps.

As an example of a conventional nonlinear broadcast system in which the hardware resource management is performed, Japanese Laid-Open Patent Application No. 11-261510 discloses the following nonlinear broadcast system. This nonlinear broadcast system features in its exclusive control structure where a broadcast device reserved by one user from a certain terminal cannot be used by the other terminals.

The structure of this conventional nonlinear broadcast system can be modified to perform the bandwidth management, by comparing the above broadcast device to a bandwidth utilized for a certain amount of data for accessing the hard disc or the like. If the user sets in advance to secure a fixed bandwidth of 120 Mbps for the two sets of video data for broadcasting the above program, data transfer that is free from the broadcast accidents can be realized. In this case, a bandwidth remaining after the bandwidth of 120 Mbps has been secured can be allocated to data transfer with less urgency such as writing material data to the hard disc or the like, or accessing the hard disc or the like for manipulating and editing the written material data.

However, even in the nonlinear broadcast system capable of transmitting two sets of video data in a mixed state, two sets of video data are not always required at one time, but at least one set of video data is always transmitted. Each set of video data is transmitted according to a video reproduction schedule determined in advance in a program editing procedure or the like, where transmission of two sets of video data at one time is scheduled at the maximum.

If an enough bandwidth to transfer video data from the hard disc or the like for broadcast is always secured in advance to prevent the broadcast accidents, that is to say, if an enough bandwidth to reproduce two sets of video data in real time is secured in advance, the problem often occurs as only a portion of the secured bandwidth is actually utilized. Since a relatively wide bandwidth is required for transferring video data, allowing such a bandwidth that is secured but not utilized leads to a drastic decrease in the utilization efficiency of hardware resources.

SUMMARY OF THE INVENTION

In view of the above problem, the object of the present invention is to provide a nonlinear broadcast system that prevents broadcast accidents from happening, while improving the utilization efficiency of hardware resources.

The above object can be achieved by a nonlinear broadcast system that broadcasts material data by executing a plurality of transfer processes of the material data for broadcast in parallel for at least a certain duration, the transfer processes for broadcast utilizing a common hardware resource, the nonlinear broadcast system including: a material storage unit storing the material data; a duration information storage unit storing duration information showing durations, in each of which a different one of the transfer processes for broadcast is scheduled to be executed; a first allocation unit for allocating a required amount of the hardware resource to each transfer process for broadcast, for the corresponding duration shown by the duration information; an available amount calculation unit for calculating an available amount of the hardware resource remaining after the first allocation unit has allocated the required amount to each transfer process for broadcast; a second allocation unit for allocating, to one or more background transfer processes that are processes other than the transfer processes for broadcast, as much amount of the hardware resource as possible, so as not to exceed the calculated available amount; and a process execution unit for executing (a) each transfer process for broadcast utilizing the amount of hardware resource allocated by the first allocation unit, and (b) each background transfer process utilizing the amount of hardware resource allocated by the second allocation unit.

With this construction, a certain amount of a hardware resource is secured for transfer processing for broadcast, that is, for data transfers directly related to broadcast, based on duration information showing the time determined in advance. Therefore, broadcast accidents can be prevented from happening. Also, an available amount of the hardware resource remaining after the hardware resource allocation for broadcast can be fully utilized for other processing that is not directly related to broadcast, such as broadcast preparation processing. Accordingly, the utilization efficiency of the hardware resource can be improved. More specifically, by giving priority to the data transfers for broadcast to prevent the broadcast accidents from happening, the remaining hardware resource can be allocated to the other processing such as reading material data for broadcast preparation. Therefore, the processing from reading a material, editing the material, to broadcasting the material can be executed smoothly.

Also, the available amount calculation unit may calculate the available amount of the hardware resource, every time when one of a start time and an end time of each duration shown by the duration information is reached.

With this construction, at the time when an amount of a hardware resource to be allocated to processing for broadcast changes, an amount of the hardware resource remaining after the allocation, that is, an available amount of the hardware resource is calculated automatically. The calculated available amount of the hardware resource can be allocated fully to processing that is not directly related to broadcast, but is for broadcast preparation. Therefore, the utilization efficiency of the hardware resource can be improved.

Also, the material storage unit may be a readable and writable recording medium, the hardware resource may be a band for an access to the recordingmedium, the first allocation unit may allocate a required bandwidth of the band to each transfer process for broadcast, the available amount calculation unit calculate an available bandwidth by subtracting the bandwidth allocated to each transfer process for broadcast by the first allocation unit from a total bandwidth of the band for the access to the recording medium, the second allocation unit may allocate, to each background transfer process, as much bandwidth of the band as possible, so as not to exceed the calculated available bandwidth, and the process execution unit may execute (a) each transfer process for broadcast utilizing the bandwidth allocated by the first allocation unit, and (b) each background transfer process utilizing the bandwidth allocated by the second allocation unit.

With this construction, in a total bandwidth of a band for data transfer to be executed by accessing a recording medium on which broadcast materials are recorded, a required minimum bandwidth can be allocated for broadcast. The remaining bandwidth is then allocated to other processing to be executed by accessing the recording medium. Therefore, the utilization efficiency of the recording medium can be improved.

Also, each background transfer process may be a process for writing the material data to the recording medium, and each transfer process for broadcast may be a process for reading the material data from the recording medium.

With this construction, an amount of a hardware resource remaining after a certain amount of the hardware resource has been allocated to data transfer for broadcast can be fully allocated to processing for broadcast preparation to store material data collected at fields into a recording medium such as a hard disc. Therefore, the broadcast preparation can be executed promptly.

Also, the material data may be video data, the recording medium may be a hard disc, and the nonlinear broadcast system may include: a transmitting device for converting the video data so as to be in a broadcast format, and broadcasting the converted video data; a plurality of nonlinear editing devices each being provided so as to correspond to one hard disc and including a coder-decoder, the first allocation unit, the second allocation unit, the available amount calculation unit, and the process execution unit, the process execution unit executing each transfer process for broadcast for reading the video data from the hard disc corresponding to the nonlinear editing device and outputting the read video data via the coder-decoder; and a switcher for selecting video data, out of video data outputted by each of the nonlinear editing devices, and sending the selected video data to the transmitting device.

With this construction, a minimum bandwidth required at the time shown by duration information for data transfer of each video data to be broadcasted is secured. The remaining bandwidth can be allocated to processing for broadcast preparation to transfer a material from a material server to a hard disc that is a work area in a nonlinear editing device. Therefore, the broadcast preparation such as manipulating a material that has been read from the material server and written to the hard disc can be executed promptly and smoothly.

Also, each nonlinear editing device may further include an effect addition unit for adding an effect to the video data when the video data is outputted via the coder-decoder.

With this construction, video data can be broadcasted, with an effect being added to the video data in real time.

Also, the nonlinear broadcast system may further include a transfer complete time display unit for obtaining an amount of data to be transferred by each background transfer process, calculating a time at which the background transfer process is to be completed, based on the bandwidth allocated by the second allocation unit, and displaying the calculated time.

With this construction, a program editor or the like can be notified of the completion time at which processing for broadcast preparation to execute data transfer utilizing a bandwidth remaining after prioritized material data transfer for broadcast is completed.

Also, each transfer process for broadcast may be a process for reading the material data from the recording medium, organizing the read material data so as to be in a format suitable for a streaming-type delivery, and performing the streaming-type delivery, and each background transfer process maybe a process for reading the material data from the recording medium, organizing the read material data so as to be in a format suitable for a download-type delivery, and performing the down-load type delivery.

With this construction, a streaming-type delivery that cannot afford to allow a delay or an interruption in broadcast since data is reproduced in real time by a broadcast reception device, can be executed promptly and surely. Also, a bandwidth remaining after a bandwidth has been allocated to the streaming-type delivery can be fully utilized for a download-type delivery that allows an intermittent delivery since the broadcast reception device once stores data into a recording medium and reproduces it later. Therefore, a bandwidth resource for delivery can be utilized efficiently.

Also, the available amount calculation unit may calculate the available amount, every time when one of (a) a time that is a predetermined duration before a start time of each duration shown by the duration information and (b) an end time of each duration shown by the duration information is reached.

With this construction, at the time shortly before a duration in which an amount of a hardware resource is to be allocated to processing for broadcast, an amount of the hardware resource which will remain after the amount of the hardware resource is allocated to the processing for broadcast, that is, an available amount of the hardware resource can be calculated dynamically, and the calculated available amount of the hardware resource is allocated to processing for broadcast preparation or the like. Therefore, even when a certain amount of the hardware resource is utilized for pre-processing, shortly before the processing for broadcast, broadcast accidents can be prevented from happening.

As described above, the present invention provides an effective technique for managing allocation of hardware resources to processing for broadcast and processing for broadcast preparation in a broadcast system where material data is read from a recording medium such as a hard disc and broadcasted.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 5 shows a data structure and content examples of an editing list stored in an editing list DB3011;

FIG. 7 shows a data structure and content examples of a hardware resource utilization schedule 7000 stored in a hardware resource management DB 3041;

FIG. 9 shows a data structure and content examples of a hardware resource allocation schedule 8000 sent from a hardware resource management unit 3031 to a timer unit 3051;

DESCRIPTION OF THE PREFERRED EMBODIMENT

The following describes a preferred embodiment of the present invention, with reference to the drawings.

<Construction>

Figure 1:
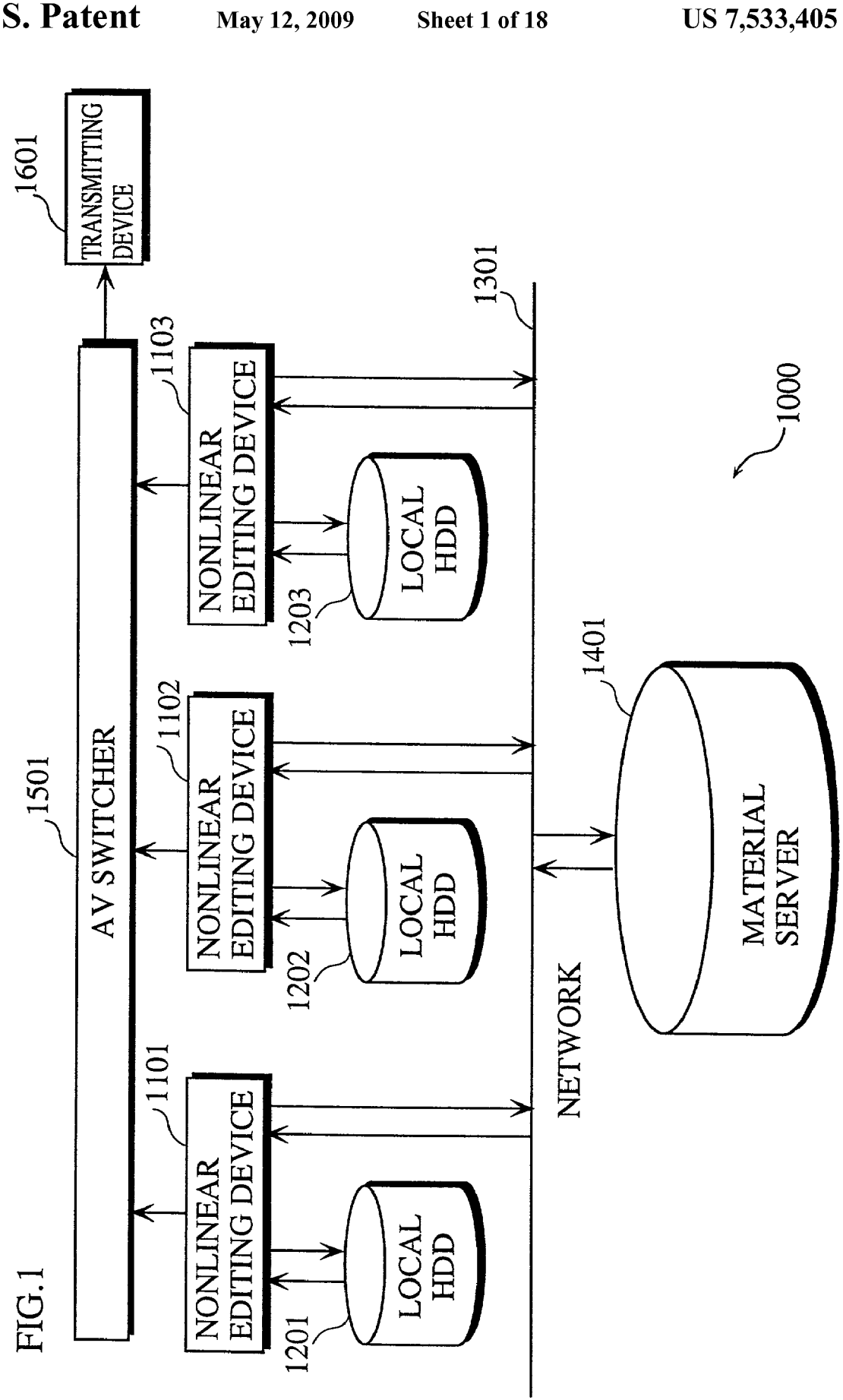
FIG. 1 schematically shows a construction of a nonlinear broadcast system 1000 relating to the present invention.

FIG. 1 schematically shows a construction of a nonlinear broadcast system 1000 to which the present invention relates.

The nonlinear broadcast system 1000 includes nonlinear editing devices 1101 to 1103, local HDDs (Hard Disc Drive) 1201 to 1203, an AV switcher 1501, a material server 1401, a transmitting device 1601, anda network 1301. The nonlinear broadcast system 1000 has the function of broadcasting video data and audio data by the transmitting device 1601, immediately after the video data and the audio data are edited by the nonlinear editing devices 1101 to 1103.

Here, the material server 1401 is a large-capacity HDD that stores material data of video and audio recorded at fields, that is, video data and audio data.

The local HDDS 1201 to 1203 are respectively connected to the nonlinear editing devices 1101 to 1103 via a SCSI interface, and are used for storing material data that is to be manipulated, edited, and broadcasted.

The network 1301 is the Gigait Ethernet.

The nonlinear editing devices 1101 to 1103 have the following functions. The nonlinear editing devices 1101 to 1103 obtain material data stored in the material server 1401 via the network 1301 according to an indication given by a user, or a program editor, and stores the obtained material data respectively into the local HDDs 1201 to 1203. Also, the nonlinear editing devices 1101 to 1103 manipulate and edit the material data stored in the local HDD 1201 and the like, read the manipulated material data or original material data from the local HDD 1201 and the like, and reproduce video and the like based on the read material data. With this reproduction, the material data stored in the local HDD 1201 and the like, specifically, video data and audio data, is sent to the transmitting device 1601 as data for broadcast, via the AV switcher 1501.

It should be noted here that one nonlinear editing device receives operations of one program editor.

The AV switcher 1501 selects specific data for broadcast, out of data that has been sent from each of the nonlinear editing devices 1101 to 1103, and sends the selected data to the transmitting device 1601.

The transmitting device 1601 has the function of multiplexing and modulating input video data and audio data, and transmitting the resulting data, in the form of broadcast waves, to houses. More specifically, the transmitting device 1601 converts the video data and the like so as to be in a specific format for broadcast, such as a format of a transport stream specified by ISO/IEC13818-1 (MPEG-2 system specification) and then transmits the converted data.

The following describes the nonlinear editing device 1101 above in more detail.

Figure 2:
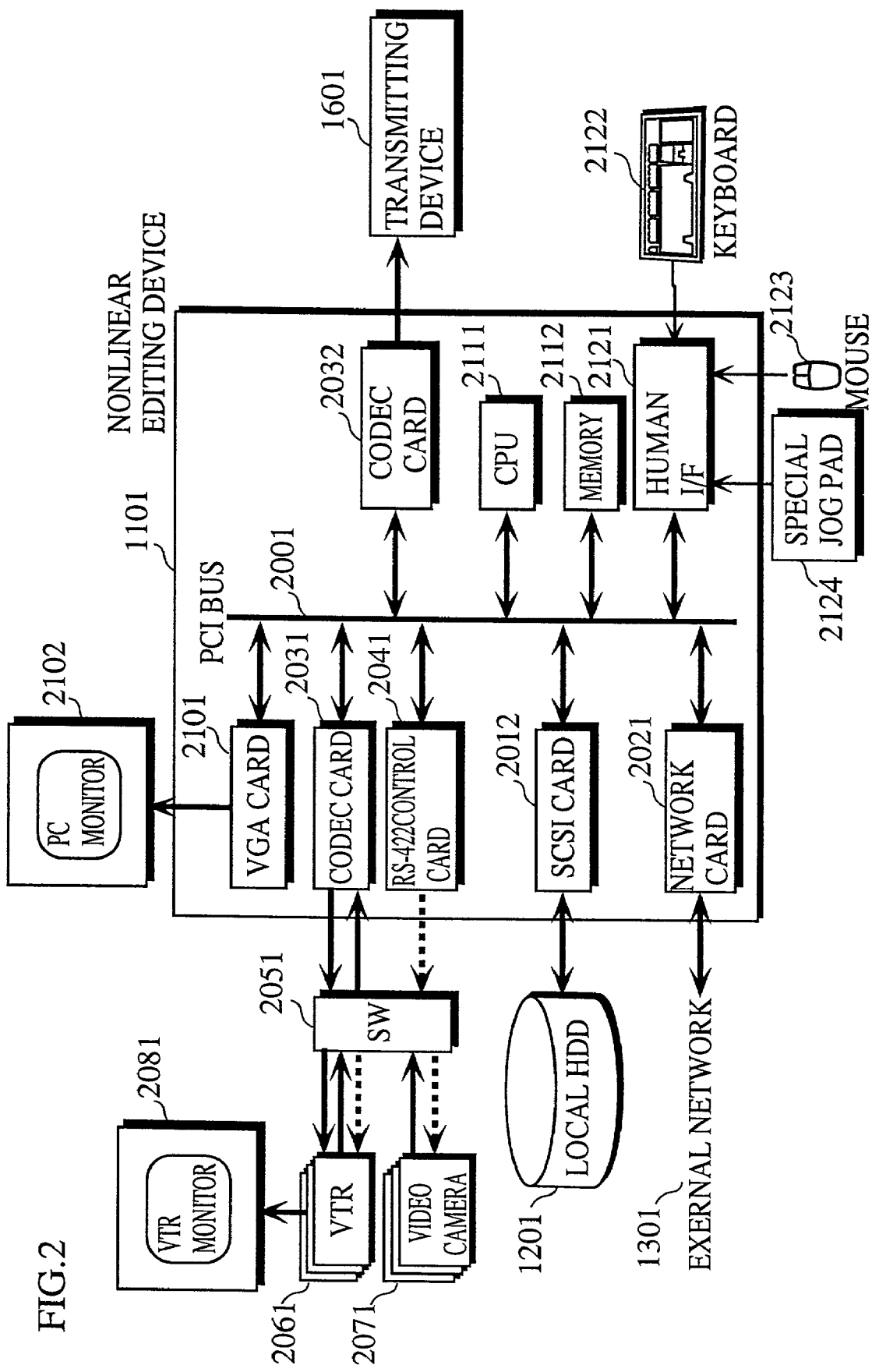
FIG. 2 shows a hardware construction of a nonlinear editing device 1101.

FIG. 2 shows a hardware construction of the nonlinear editing device 1101. Note that the figure also illustrates devices connected to the nonlinear editing device 1101.

The nonlinear editing device 1101 is roughly composed of a PCI bus 2001, a SCSI card 2012, a network card 2021, CODEC cards 2031 and 2032, an RS-422 control card 2041, a VGA card 2101, a CPU 2111, a memory 2112, and a human I/F (InterFace) 2121. The nonlinear editing device 1101 is connected to the local HDD 1201, the network 1301, the transmitting device 1601, a keyboard 2122, a mouse 2123, a special jog pad 2124, and a PC monitor 2102. The nonlinear editing device 1101 is also connected to video cameras 2071, VTRs 2061, and a VTR monitor 2081 via an SW (SWitcher) 2051.

Here, the memory 2112 stores an operating system (OS) and an application program (hereafter referred to as a "control program") for realizing the functions of the nonlinear editing device, such as editing and reproducing. Also, the memory 2112 is used for storing data when the control program is executed.

The PCI bus 2001 is a synchronous bus for data transfer between the CPU 2111, the memory 2112, and various cards such as the SCSI card 2012.

The human I/F 2121 is an interface mechanism for receiving an operation from the program editor via the keyboard 2122, the mouse 2123, and the special job pad 2124, and notifying the CPU 2111 of the received operation.

The CPU 2111 receives an indication of the program editor via the human I/F 2121, executes a control program stored in the memory 2112 according to the received program editor's indication, to control each unit of the nonlinear editing device 1101 to realize its functions, such as editing and reproducing.

The SCSI card 2012 is an interface for connecting the local HDD 1201 and the PCI bus 2001 based on SCSI Specification. The network card 2021 is an interface card for connecting the network 1301 and the PCI bus 2001.

The CODEC cards 2031 and 2032 have the following functions. The CODEC cards 2031 and 2032 are used for inputting and outputting video data and audio data to and from the VTR 2061 and the video camera 2071 that are external video and audio devices, and the transmitting device 1601. The CODEC cards 2031 and 2032 encode input data so as to be in a format suitable for being stored in the local HDD 1201. Also, the CODEC cards 2031 and 2032 decode video data and audio data for sending them to the external video and audio devices and the like. Furthermore, the CODEC cards 2031 and 2032 have the functions of giving special effects to the data, and of superimposing a plurality of sets of video data one on top of another. Note that although the AV switcher 1501 (see FIG. 1) is not shown in FIG. 2, the CODEC card 2032 is actually connected to the transmitting device 1601 via the AV switcher 1501.

The RS-422 control card 2041 is used for sending control signals indicating "reproduce", "record", "rewind", "fast-forward", and the like, to the VTR 2061 and the video camera 2071 that are the external video and audio devices.

The SW 2051 selects a set of video and audio input and output terminals and a control signal input terminal of one of the plurality of the VTRs 2061 and the video cameras 2071, and connects the selected set of video and audio input and output terminals and the control signal input terminal, with the video and audio input and output terminals of the CODEC card 2031 and the control output terminal of the RS-422 control card 2041.

The VTR monitor 2081 displays video and audio that are presently being reproduced or recorded by the VTR 2061.

Also, the VGA card 2101 displays an image constituting a "graphical user interface (GUI)" specified by the control program that is being executed by the CPU 2111.

It should be noted that the nonlinear editing devices 1102 and 1103 each have the same construction as the nonlinear editing device 1101.

The following describes the CODEC card 2032 above in more detail.

Figure 3:
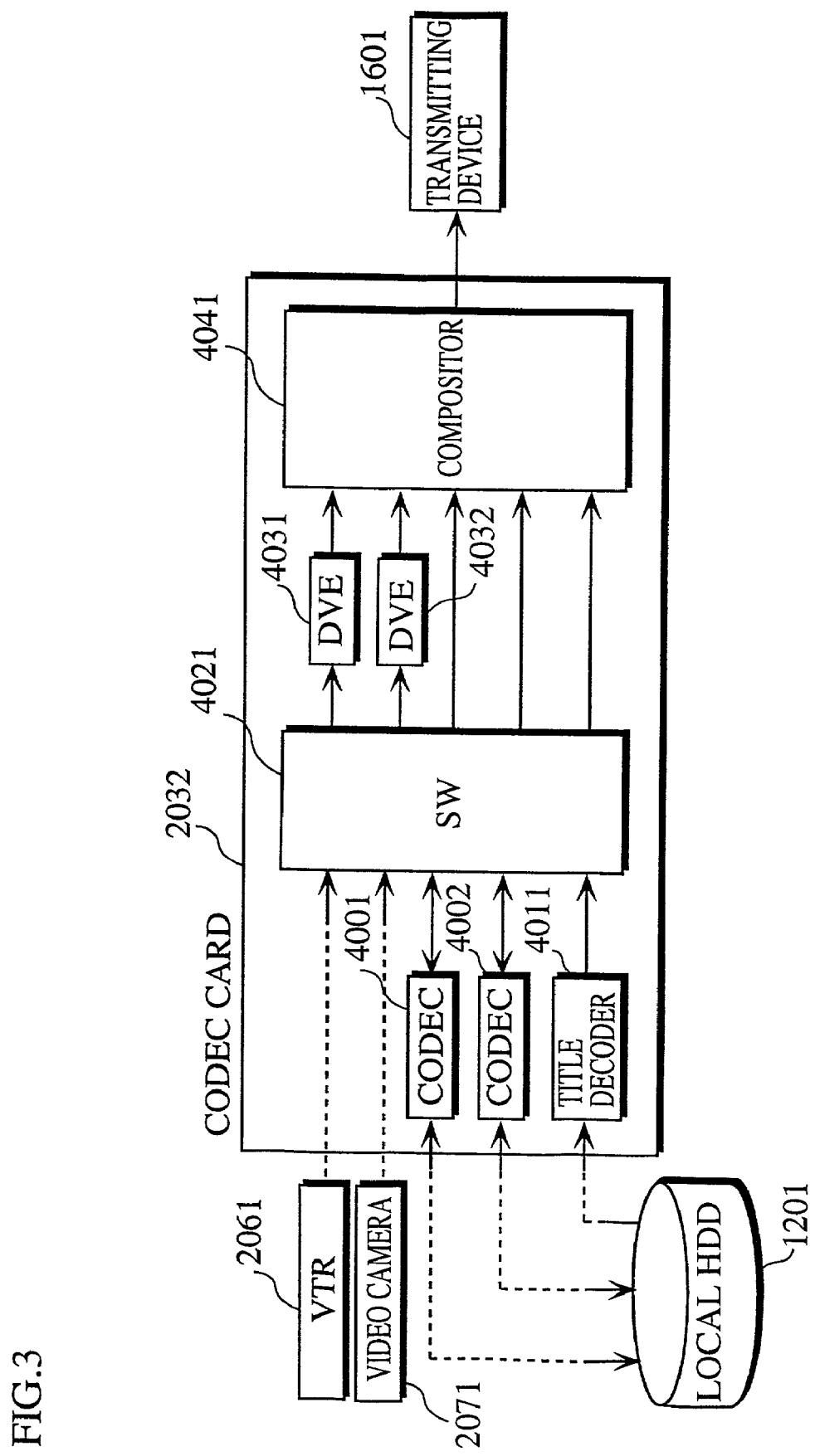
FIG. 3 is a functional block diagram of a CODEC card 2032.

FIG. 3 shows a functional block diagram of the CODEC card 2032.

The CODEC card 2032 is roughly composed of CODECs 4001 and 4002, a title decoder 4011, an SW 4021, DVEs (Digital Video Effect) 4031 and 4032, and a compositor 4041. Examples of an interface between the CODEC card 2032 and the transmitting device 1601 are an analog component, an analog composite, an SDI (Serial Digital Interface), and the like.

The CODECs 4001 and 4002 have the functions of decompressing (decoding) video data and audio data that have been compressed and stored in the local HDD 1201, and compressing (encoding) video data and audio data that have been outputted by the VTR 2061 and the video camera 2071 so as to be in a data format suitable for being stored in the local HDD 1201. Examples of the format suitable for being stored in the local HDD 1201 are MPEG-2, Consumer-Use DV, DVCPRO25, DVCPRO50, and the like. Examples of the format for being inputted and outputted to and from the VTR and the like are NTSC, PAL, and the like.

The title decoder 4011 decompresses a title video material, such as a telop and a roll, that has been compressed and stored in the local HDD 1201, so as to be in a format suitable for the transmitting device 1601.

The SW 4021 selects specific data, out of data inputted from each of the VTR 2061, the video camera 2071, the CODEC 4001, the CODEC 4002, and the title decoder 4011, to send the selected data to the DVEs 4031 or 4032.

The DVEs 4031 and 4032 give various effects such as picture-in-picture, mask, strobe, crop, mosaic, and color correction, to video data outputted from the SW 4021, and send the video data to which the effects have been given, to the compositor 4041.

The compositor 4041 superimposes sets of video data that have been inputted from the SW 4021 and the DVEs 4031 and 4032, one on top of another, and sends the resulting video data, and input audio data to the transmitting device 1601.

The following describes the functions of the nonlinear editing device 1101, focusing on hardware resource allocation control performed for various processing such as program editing and program reproducing.

Here, hardware resources to be allocated by way of the hardware resource allocation control are represented by the CODEC card, the RS-422 control card, and the like. The hard disc that is accessed via the SCSI card for storing video data and the like can also be allocated. Here, a maximum value for a data transfer amount per time unit for writing and reading data to and from the hard disc via the SCSI card depends on performances of the HDD. It should be noted here that a bandwidth indicating the data transfer amount per time unit is regarded as a kind of hardware resource.

Figure 4:
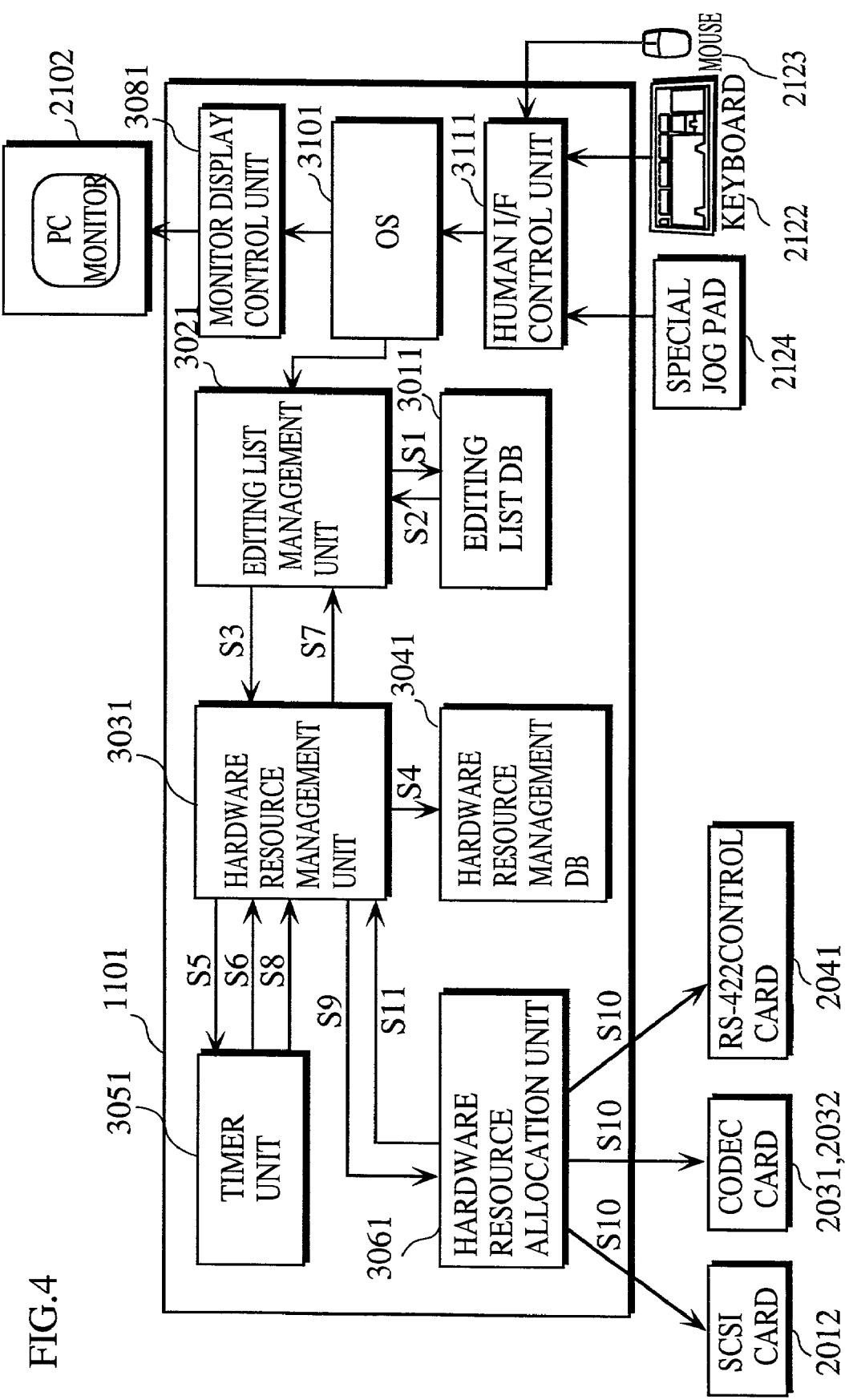
FIG. 4 is a functional construction diagram of software of the nonlinear editing device 1101.

FIG. 4 is a functional construction diagram relating to the hardware resource allocation control performed by the nonlinear editing device 1101. Note that FIG. 4 also shows flows of data and messages between the functional units. Messages and the like are sent in the order of reference numerals S1, S2, S3, to S11.

As shown in the figure, the nonlinear editing device 1101 includes, as its functional units, an editing list DB (Data Base) 3011, an editing list management unit 3021, a hardware resource management unit 3031, a hardware resource management DB 3041, a timer unit 3051, a hardware resource allocation unit 3061, a monitor display control unit 3081, an OS 3101, and a human I/F control unit 3111. The function of each of these units is realized basically by the memory 2112, or the CPU 2111 executing a control program.

Here, the editing list DB 3011 is a memory area storing an editing list for each program to be reproduced by the nonlinear editing device 1101. Each editing list shows a reproduction schedule of video data and the like for the program. The editing list is generated in advance by the program editor using the editing list management unit 3021, and it can be updated. A detailed explanation will be given on the editing list later.

The editing list management unit 3021 has the following functions. The editing list management unit 3021 updates an editing list for editing a program. When the CPU 2111 detects an operation of the program editor with the keyboard 2122, the mouse 2123, or the special job pad 2124 via the human I/F 2121, the editing list management unit 3021 receives a value to be set for each item of an editing list specified by the detected operation, via the human I/F control unit 3111 and the OS 3101. The editing list management unit 3021 then updates the editing list included in the editing list DB 3011 in accordance with the specified contents. Also, when receiving an indication to reproduce a program from the program editor for broadcasting the program, that is, for sending video data and the like for the program to the transmitting device 1601, the editing list management unit 3021 sends an editing list for the program to the hardware resource management unit 3031.

The hardware resource management unit DB 3041 is a memory area storing a hardware resource utilization schedule. Note that the hardware resource utilization schedule will be explained in detail later.

The hardware resource management unit 3031 has the following functions. The hardware resource management unit 3031 receives an editing list form the editing list management unit 3021, schedules hardware resource allocation required for reproducing video data and the like for the program, stores a hardware resource utilization schedule into the hardware resource management unit DB 3041, and instructs the timer unit 3051 to perform allocation time detection according to the schedule. Also, the hardware resource management unit 3031 instructs the hardware resource allocation unit 3061 to perform hardware resource allocation when receiving an allocation time notification message from the timer unit 3051. Note here that the "allocation time detection" is to detect a set reference time and issue an allocation time notification message indicating "the reference time is reached".

Furthermore, when the control program that is executed according to an indication or the like from the program editor requests hardware resource allocation for processing other than reproducing a program, such as writing material data to the local HDD, or accessing the local HDD for program editing, the hardware resource management unit 3031 refers to the hardware resource management DB 3041 to check the availability of a hardware resource. More specifically, the hardware resource management unit 3031 calculates an available amount of the hardware resource, by subtracting a presently occupied amount of the hardware resource from a total amount of the hardware resource. Setting the calculated available amount at the maximum, the hardware resource management unit 3031 controls the hardware resource allocation unit 3061 to allocate the hardware resource to the processing, with fully utilizing the available amount of the hardware resource.

To be more specific, when executing processing other than reproduction processing, the control program requests the hardware resource management unit 3031 to allocate a hardware resource as necessary. The hardware resource management unit 3031 features in giving priority to hardware resource allocation for reproduction processing of video data and the like in accordance with an editing list. When the control program directly requests hardware resource allocation for the preparation processing, the hardware resource management unit 3031 controls the hardware resource allocation unit 3061 to allocate as much amount of the hardware resource as possible to the processing other than reproduction processing within a range of the available amount of the hardware resource remaining after the allocation for the reproduction processing with priority.

Note here that the processing other than reproduction processing executed by the control program is basically for broadcast preparation (such processing is hereafter referred to as "broadcast preparation processing"), and so is executed in the background during broadcast. Also, the hardware resource management unit 3031 calculates an available amount of the hardware resource every time when the allocation time detection is performed. When the available amount changes, the hardware resource management unit 3031 controls the hardware resource allocation unit 3061 to re-allocate the hardware resource to the broadcast preparation processing, according to the change in the available amount of the hardware resource.

The timer unit 3051 has the function of keeping time. The timer unit 3051 receives an instruction to perform allocation time detection from the hardware resource management unit 3031 sending a hardware resource allocation schedule to the timer unit 3051. When the time specified by the hardware resource allocation schedule is reached, the timer unit sends an allocation time notification message to the hardware resource management unit 3031. The allocation time notification message includes information specifying a hardware resource to be allocated based on the hardware resource allocation schedule, and information showing occupancy of the specified hardware resource.

Also, the hardware resource allocation unit 3061 receives a hardware resource allocation instruction from the hardware resource management unit 3031. On receipt of the hardware resource allocation instruction, the hardware resource allocation unit 3061 makes a specified amount of the hardware resource available, for example, by setting a value for utilizing the specified amount of the hardware resource.

Note here that a driver that controls an access to the hard disc such as the local HDD 1201 is included in the OS, and controls a bandwidth utilized for data transfer to and from the hard disc. When the hardware resource allocation unit 3061 gives a hardware resource allocation instruction with specifying a bandwidth, the driver has the function of executing subsequent data transfer utilizing the specified bandwidth, while performing bandwidth control.

Here, the driver may divide passing time in small time units determined in advance. In this case, the driver may determine a utilization cycle of the divided time units such that how many time units are to be skipped when a request to access a hard disc is given, like when a request to transfer data, such as a request to write/read a certain amount of data to/from the hard disc is given. In this way, the driver executes the requested data transfer utilizing the specified bandwidth.

<Data Structure>

The following describes an editing list stored in the editing list DB 3011. For ease of explanation, only video data for making up a program is referred to herein. However, the same explanation can also be applied to audio data.

FIG. 5 shows a data structure and content examples of the editing list stored in the editing list DB 3011.

The editing list is a group of data consisting of an "editing list number (No.)" 6001, a "track" 6002, a "material ID" 6003, an "In-point" 6004, an "Out-point" 6005, and a "duration" 6006. In the figure, each line with a different material ID indicates a different data processing module.

Here, the "editing list No." 6001 shows a number for identifying each editing list in the editing list DB. The "track" 6002 indicates a track for the contents of the "material ID" 6003 to the "duration" 6006.

Here, there are two types of tracks, namely, "A/B roll" track, and "KEY" track. On each track, two sequent sets of video data can be reproduced seamlessly by overlapping a portion of each set of video data. It is assumed that the maximum of two sets of video data can be reproduced in a mixed state utilizing the entire two tracks. Note that the A/B roll track is basically used for video, and the KEY track is basically used for special purposes such as the picture-in-picture function, or broadcasting telops.

The "material ID" 6003 shows an ID for identifying video data stored in the local HDD 1201 to be reproduced. As one example, the material ID may be a file name of the video data.

The "In-point" 6004, the "Out-point" 6005, and the "duration" 6006 respectively indicate a reproduction start time, a reproduction end time, and a reproduction duration of video data for each data processing module.

FIG. 5 shows an example of an editing list corresponding to a certain program, the editing list number of which is "5001" (hereafter, "editing list 5001"). The editing list 5001 indicates that sets of video data "CUT1", "CUT2", and "CUT3", are sequentially reproduced on the A/B roll track, with adjacent two sets of data being overlapped for a certain duration, and that a set of video data "CUT4" is reproduced on the KEY track.

In the example shown in FIG. 5, the In-point, the Out-point, and the duration are expressed by time codes consisting of hour:minute:second:frame. It should be noted here that this example assumes that the reproduction is based on the NTSC non-drop frame time code, and 30 frames correspond to one second.

Figure 6:
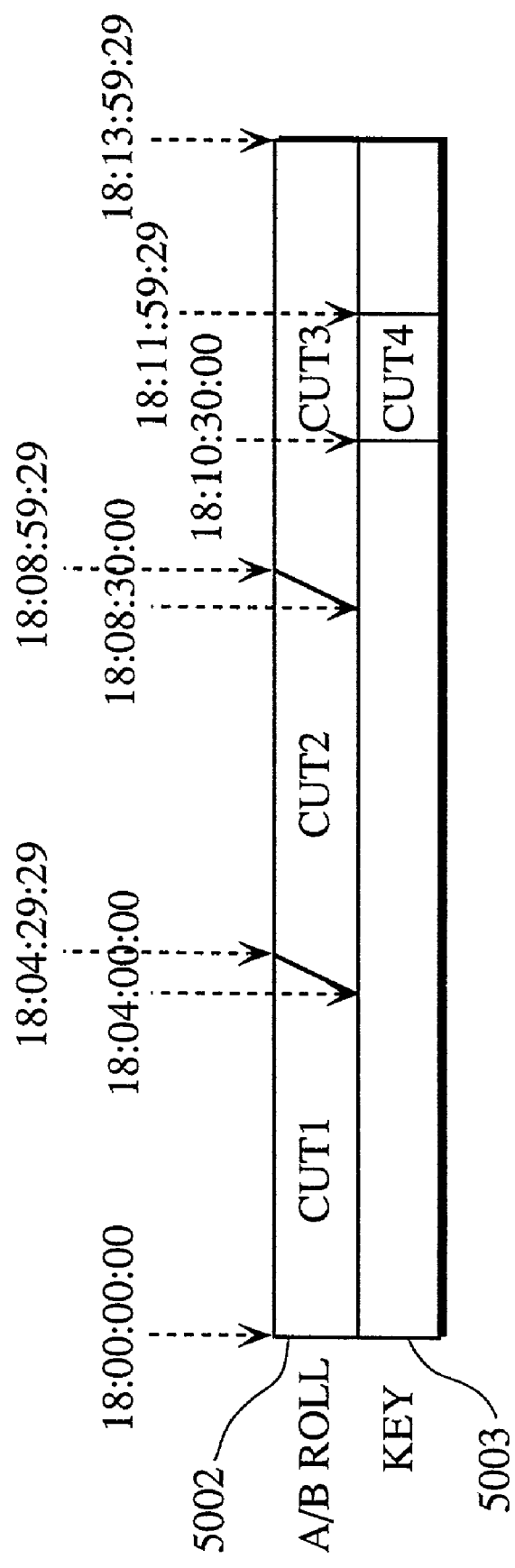
FIG. 6 shows a concept of the editing list.

The concept of the editing list 5001 shown in this example, that is, the concept of the reproduction schedule of the video data is shown in FIG. 6.

In FIG. 6, the horizontal axis is a time axis, and a reproduction schedule 5002 for the A/B roll track, and a reproduction schedule 5003 for the KEY track are shown.

The reproduction schedule 5002 indicates the following. The video data "CUT1" is being reproduced between "18:00:00:00" and "18:04:29:29", the video data "CUT2" between "18:04:00:00" and "18:08:59:29", and the video data "CUT3" between "18:08:30:00" and "18:13:59:29". An overlapping duration of 30 seconds is provided between "CUT1" and "CUT2", and between "CUT2" and "CUT3" so as to switch two sequent scenes smoothly. During each overlapping duration, a so-called transitional reproduction that is a mixed reproduction for gradually switching different scenes with time, such as wipes or dissolves, is performed.

The reproduction schedule 5003 indicates that the video data "CUT4" is being reproduced between "18:10:30:00" and "18:11:59:29".

The following describes a hardware resource utilization schedule stored in the hardware resource management DB 3041.

FIG. 7 shows a data structure and content examples of a hardware utilization schedule 7000 stored in the hardware resource management DB 3041.

The hardware resource utilization schedule 7000 is generated by the hardware resource management unit 3031 based on an editing list, and is stored in the hardware resource management DB 3041. The hardware resource utilization schedule 7000 is a group of data consisting of a "resource ID" 7001, a "maximum value" 7002, an "editing list number (No.)" 7003, a "material ID" 7004, an "occupancy" 7005, an "In-point" 7006, an "Out-point" 7007, and a "duration" 7008.

The "resource ID" 7001 shows information for identifying each hardware resource, such as the local HDD 1201, the CODEC card 2032, and the like, that can be used by the nonlinear editing device 1101.

As for the local HDD 1201, a bandwidth utilized for an access thereto via the SCSI card constitutes a kind of hardware resource (hereafter referred to as a "local HDD band").

The "maximum value" 7002 shows a maximum value of the amount of each hardware resource identified by the "resource ID" 7001. A value determined in advance for each hardware resource is used as the maximum value. The figure indicates that a maximum value of an available bandwidth of the local HDD band is "200 Mbps".

The "editing list No." 7003 shows an editing list number of each editing list used when a hardware resource is utilized for reproduction of video data. To be more specific, it shows an identification number of the editing list used for generating the hardware resource utilization schedule by the hardware resource management unit 3031.

The "material ID" 7004 shows the same data transferred from the material ID of the corresponding editing list.

The "occupancy" 7005 shows a bandwidth to be occupied for the video data transfer. Note here that the video data is in the DVCPRO50 format. It is assumed that a bandwidth required for the data transfer in this format is predetermined as "60 Mbps".

It should be noted here that for a hardware resource whose amount can be expressed by the number of items instead of a bandwidth, the maximum value and the occupancy are expressed using the number.

The "In-point" 7006, the "Out-point" 7007, and the "duration" 7008 respectively show the same data transferred from the In-point, the Out-point, and the duration of the corresponding editing list.

The example shown in FIG. 7 is the content examples of the hardware resource utilization schedule generated by the hardware resource management unit 3031 for the local HDD band 1201, based on the editing list shown in FIG. 5. According to the hardware resource utilization schedule 7000, the maximum value of an available bandwidth is "200 Mbps", and the sets of video data "CUT1" to "CUT4" each occupy a bandwidth of 60 Mbps for a duration specified by the corresponding In-point and Out-point. The concept of the hardware resource utilization schedule 7000 shown in this example is shown in FIG. 8.

Figure 8:
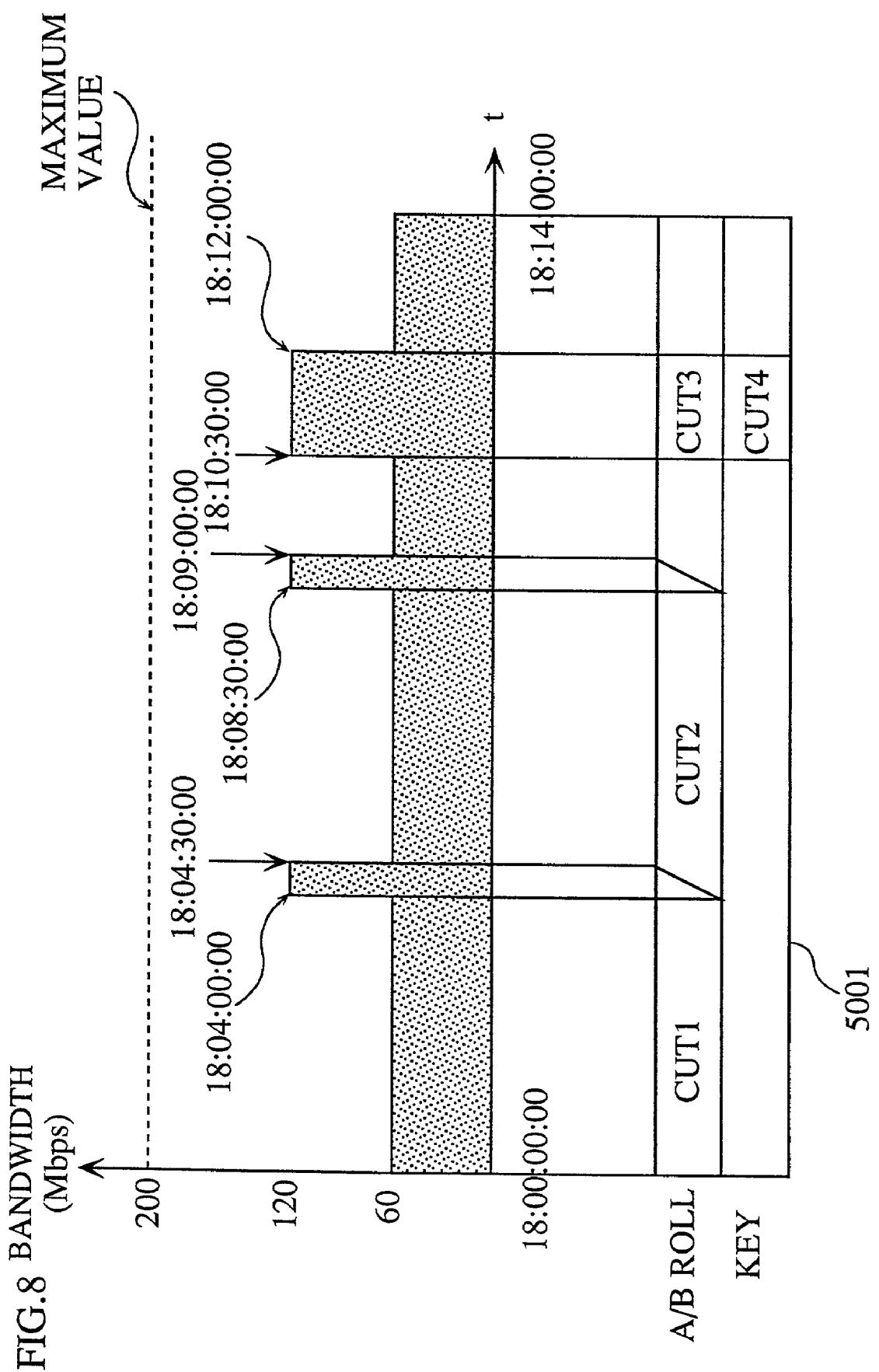
FIG. 8 shows a concept of the hardware resource utilization schedule.

In FIG. 8, the horizontal axis is a time axis, and the vertical axis indicates an occupied bandwidth that changes with time. In the figure, the concept of the corresponding editing list 5001 is also shown below. As can be seen from FIG. 8, there are two types of durations to reproduce video data according to the editing list 5001, one where a bandwidth of 60 Mbps needs to be secured, and the other where a bandwidth of 120 Mbps needs to be secured.

The following describes the hardware resource allocation schedule that is sent from the hardware resource management unit 3031 to the timer unit 3051, for instructing the timer unit 3051 to perform allocation time detection according to the schedule.

FIG. 9 shows a data structure and content examples of a hardware resource allocation schedule 8000 sent from the hardware resource management unit 3031 to the timer unit 3051.

The hardware resource allocation schedule 8000 is generated, with reference to the hardware resource utilization schedule generated by the hardware resource management unit 3031. The hardware resource allocation schedule 8000 is a group of data consisting of an "allocation time" 8001, a "resource ID" 8002, a "timer ID" 8003, an "allocation type" 8004, and a "total occupancy" 8005.

The "allocation time" 8001 shows a time at which allocation time is to be detected, and is set based on either the In-point or the Out-point specified in the editing list. Based on the Out-point, the allocation time is set as the time at which an immediately succeeding frame is reproduced. More specifically, the allocation time is set as the time at which the bandwidth utilized for the reproduction processing of a program based on the editing list changes.

The "resource ID" 8002 shows the same data transferred from the resource ID in the hardware resource utilization schedule. More specifically, the "resource ID" 8002 shows information for specifying a hardware resource to be allocated.

The "timer ID" 8003 shows information for being associated with a specific data processing module in the hardware resource schedule. Specifically, the "timer ID" 8003 shows the same data transferred from the material ID in the hardware resource utilization schedule.

The "allocation type" 8004 shows information indicating whether the time at which the allocation time detection is performed is In-point to start reproduction of the corresponding video data, or Out-point to end the reproduction. The "allocation type" 8004 shows a value indicating either "In" or "Out".

Also, the "total occupancy" 8005 shows a total bandwidth occupied for the reproduction of the video data based on the corresponding editing list at the time the allocation time detection is performed based on the hardware resource utilization schedule. The hardware resource management unit 3031 calculates and sets the "total occupancy" 8005. Information showing the total occupancy is included in the allocation time notification message sent by the timer unit 3051 and is utilized for notifying the hardware resource allocation unit 3061 of an amount of a hardware resource to be allocated.

It should be noted that the content examples in the figure correspond to the editing list 5001 and to the hardware resource utilization schedule for the local HDD band described above.

<Operation>

The following describes the operation of the nonlinear broadcast system 1000 that has the above described construction and handles the above described data.

The program editor gives an indication to reproduce a program to the nonlinear editing device 1101. In response to the program editor's indication, the nonlinear editing device 1101 performs hardware resource allocation as necessary, and executes the reproduction processing. In the nonlinear broadcast system 1000, the reproduction processing of the program results in the program being broadcasted.

Figure 10:
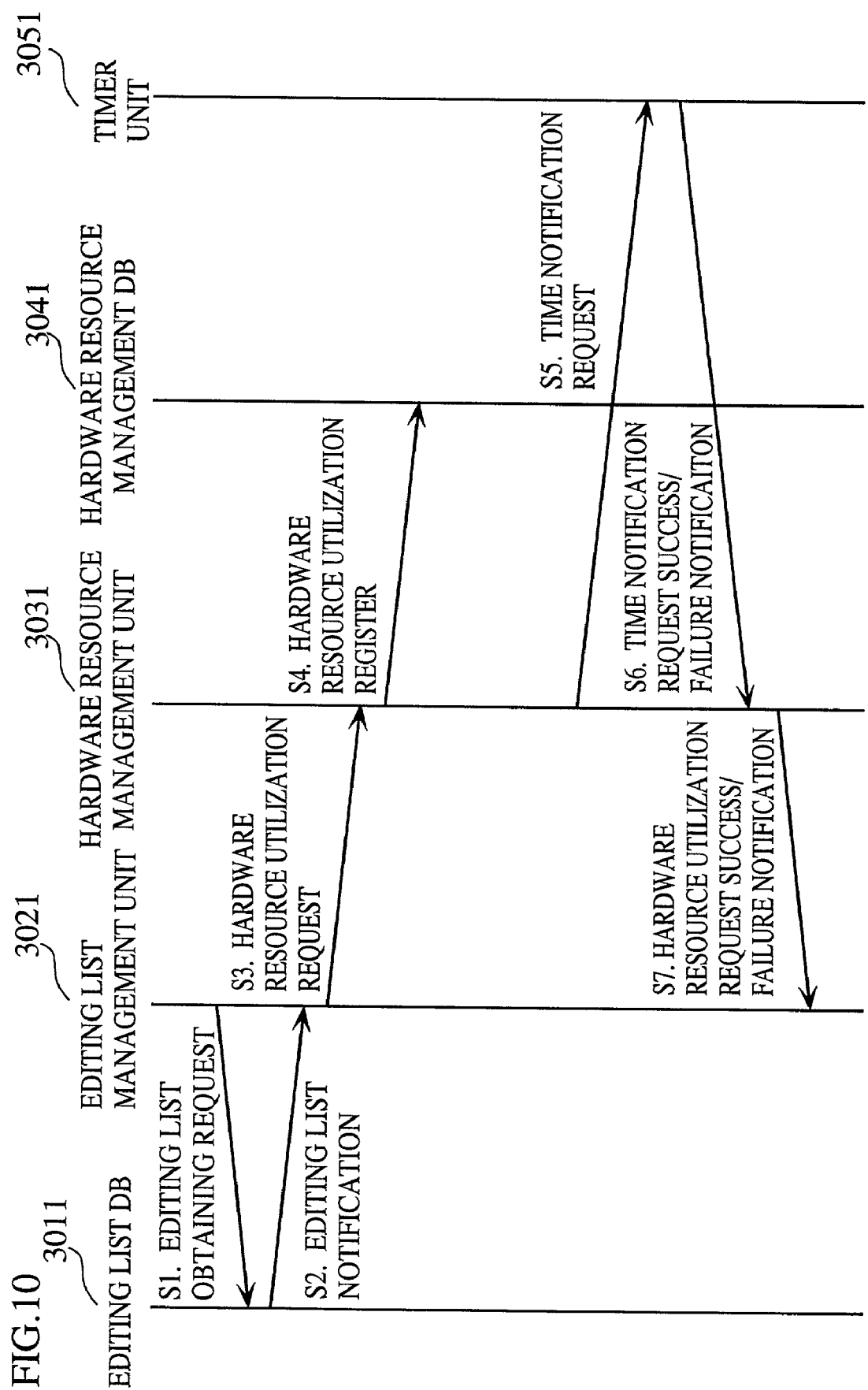
FIG. 10 shows a sequence of messages and the like between the functional units for reproducing video data, from when the hardware resource management unit 3031 generates a hardware resource utilization schedule based on an editing list to when the hardware resource management unit 3031 instructs the timer unit 3051 to perform time detection.

FIG. 10 shows a transmission/reception sequence of data and messages between the functional units for reproducing video data. The figure shows the sequence from when the hardware resource management unit 3031 generates a hardware resource utilization schedule based on an editing list to when the hardware resource management unit 3031 instructs the timer unit 3051 to perform the allocation time detection. In the figure, reference numerals added to the transmission/reception sequence of messages and the like correspond to the reference numerals in FIG. 4.

The editing list management unit 3021 in the nonlinear editing device 1101 generates an editing list according to the program editor's operation, and updates the editing list or the like. After that, when the program editor gives an indication to reproduce a program by specifying an editing list number, the editing list management unit 3021 sends an editing list request message requesting to obtain the editing list with specifying the editing list number, to the editing list DB 3011 (S1). The editing list management unit 3021 then obtains the editing list from the editing list DB 3011 (S2: EDITING LIST NOTIFICATION). The following explanation will be given, assuming that the editing list 5001 whose content examples are shown in FIG. 5 is obtained in this step.

Obtaining the editing list, the editing list management unit 3021 sends it to the hardware resource management unit 3031, and sends a hardware resource utilization request message requesting the scheduling for hardware resource utilization (S3).

The hardware resource management unit 3031, which has been requested to schedule the hardware resource utilization, generates the hardware resource utilization schedule based on the editing list, and sends and stores the generated schedule into the hardware resource management DB 3041 (S4: HARDWARE RESOURCE UTILIZATION REGISTER). This results in the hardware resource utilization schedule 7000 whose content examples are shown in FIG. 7 being generated.

It should be noted that if the hardware resource management unit 3031 detects the time at which a bandwidth to be occupied exceeds the maximum value of a hardware resource when generating the hardware resource utilization schedule based on the editing list, the hardware resource management unit 3031 suspends the generation of the hardware resource utilization schedule, and sends a hardware resource utilization success/failure message indicating "failure", to the editing list management unit 3021 (S7). In this case, a time notification request (S5) and a time notification success/failure message (S6) are omitted.

After registering the hardware resource utilization schedule into the hardware resource management DB 3041 (S4), the hardware resource management unit 3031 instructs to perform allocation time detection by generating a hardware resource allocation schedule and sending it to the timer unit 3051 (S5: TIME NOTIFICATION REQUEST). Here, the hardware resource allocation schedule 8000 whose content examples are shown in FIG. 9 is generated and sent to the timer unit 3051.

On receipt of the instruction to perform allocation time detection, the timer unit 3051 sets the timer so as to detect each allocation time specified by the hardware resource allocation schedule. Following this, the hardware resource management unit 3031 returns the time notification request success/failure message indicating "success" to the hardware resource management unit 3031 (S6). Here, if any error occurs, the timer unit 3051 returns the time notification request success/failure message indicating "failure" (S6).

On receipt of the message indicating "success", the hardware resource management unit 3031 sends the hardware resource utilization request success/failure notification message indicating "success" to the editing list management unit 3021 (S7). Here, if any error occurs, the hardware resource management unit 3031 sends the hardware resource utilization request success/failure message indicating "failure" (S7)

On receipt of the hardware resource utilization request success/failure notification message indicating "failure" (S7), the editing list management unit 3021 notifies the program editor of an error occurrence via the monitor display control unit 3081 or the like.

The following describes the generation of the hardware resource allocation schedule by the hardware resource management unit 3031.

Figure 11:
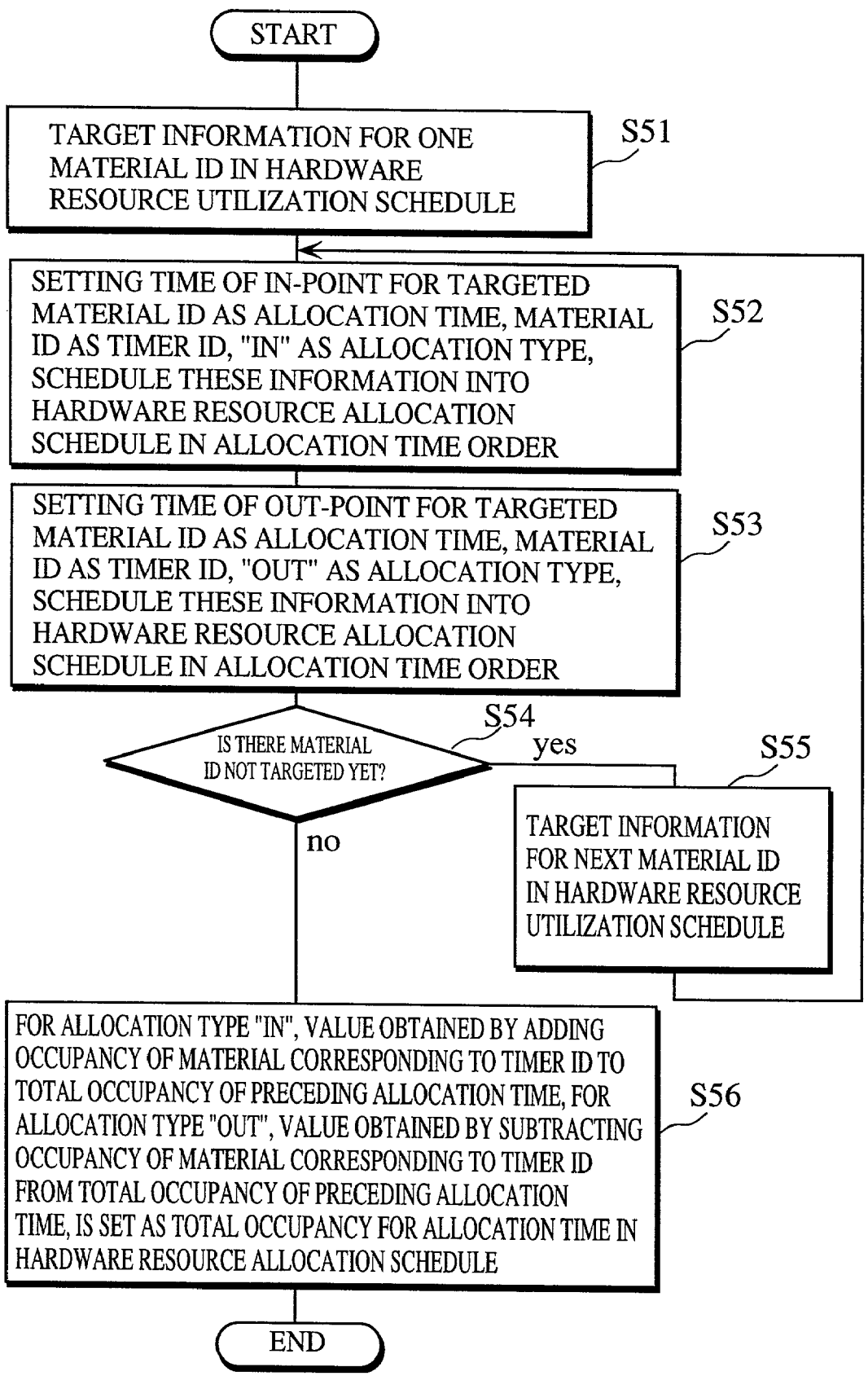
FIG. 11 is a flowchart showing operation procedures for generating the hardware resource allocation schedule by the hardware resource management unit 3031.

FIG. 11 is a flowchart showing the operation procedures for generating the hardware resource allocation schedule by the hardware resource management unit 3031.

The hardware resource management unit 3031 targets information relating to one material ID in the hardware resource utilization schedule (see FIG. 7), that is information relating to one data processing module (step S51).

Following step S51, the hardware resource management unit 3031 sets the time of the In-point for the targeted material ID as an allocation time, the material ID as a timer ID, and a value indicating "In" as an allocation type, and schedules the set allocation time, timer ID, and allocation type into the hardware resource allocation schedule, in such a manner that the targeted material is inserted into the schedule in the allocation time order (step S52).

Following step S52, the hardware resource management unit 3031 sets the time of the Out-point for the targeted material ID as an allocation time, the material ID as a timer ID, and a value indicating "Out" as an allocation type, and schedules the set allocation time, timer ID, and allocation type into the hardware resource allocation schedule, in such a manner that the targeted material is inserted in the allocation time order (step S53).

Following step S53, the hardware resource management unit 3031 judges whether there is a material ID that is not yet targeted (step S54). When the judgment result in step S54 is affirmative, the hardware resource management unit 3031 targets information relating to the next material ID in the hardware resource utilization schedule (step S55), and repeats the processing from steps S52 to S54.

When the judgment result in step S54 is negative, the hardware resource management unit 3031 sets a total occupancy of the hardware resource corresponding to each allocation time in the hardware resource allocation schedule.

To be more specific, the hardware resource management unit 3031 targets each allocation time, and if the allocation type of the targeted allocation time is a value indicating "In", the hardware resource management unit 3031 obtains a value by adding (a) an occupancy determined in advance for the present material specified by the timer ID corresponding to the targeted allocation time to (b) the total occupancy for a material immediately preceding the present material, and sets the obtained value as the total occupancy corresponding to the targeted allocation time. If the allocation type of the targeted allocation time is a value indicating "Out", the hardware resource management unit 3031 obtains a value by subtracting (a) the occupancy determined in advance for the present material specified by the timer ID corresponding to the targeted allocation time from (b) the total occupancy of a material immediately preceding the present material, and sets the obtained value as the total occupancy corresponding to the targeted allocation time (step S56).

The operation procedures described above result in the hardware resource allocation schedule shown in FIG. 9 being generated.

Figure 12:
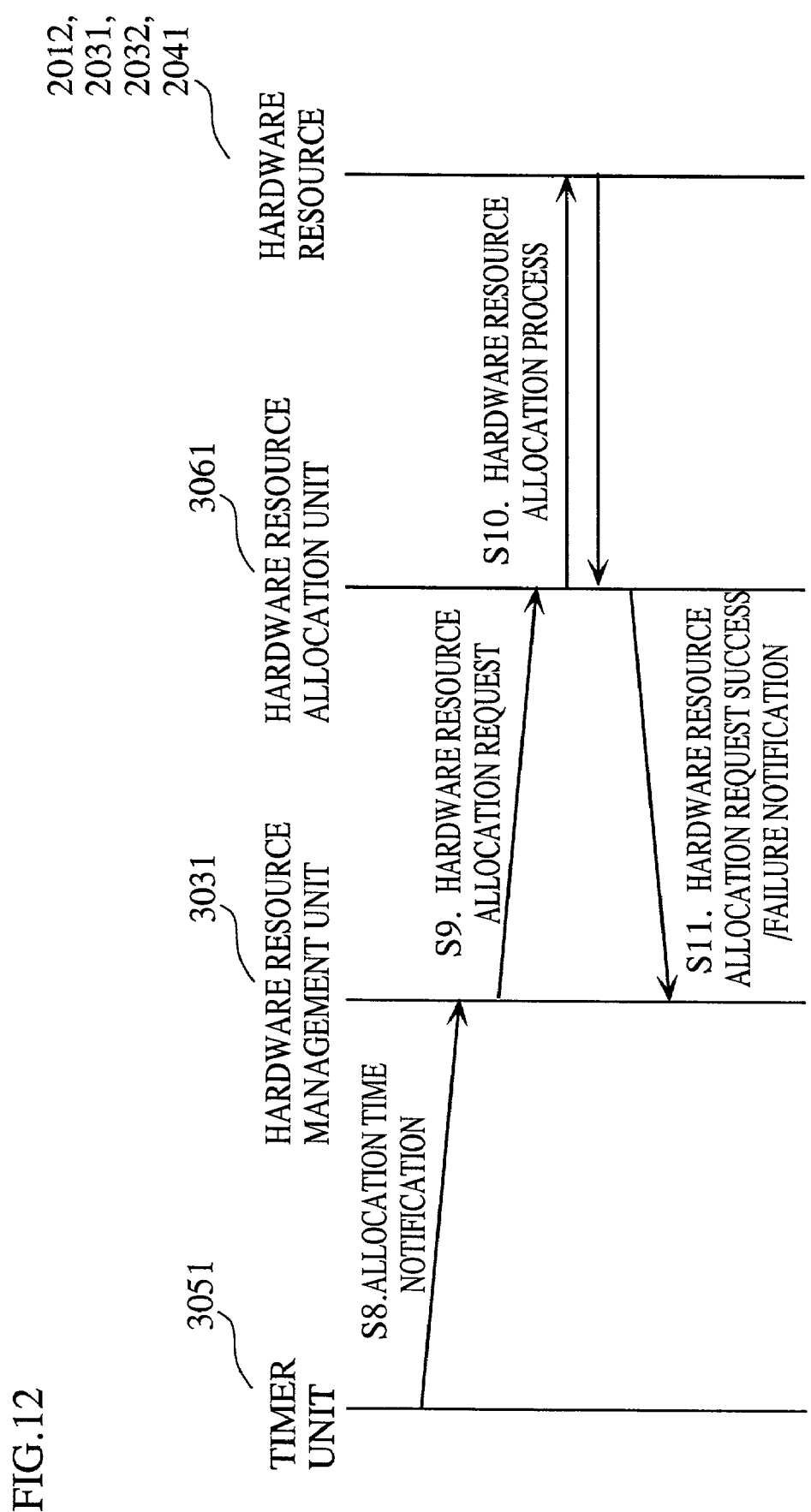
FIG. 12 shows a sequence of messages and the like between the functional units from when the timer unit 3051 sends an allocation time notification message to when a hardware resource is allocated.

FIG. 12 shows a transmission/reception sequence of data and messages between the functional units from when the timer unit 3051 sends the allocation time notification message to when a hardware resource is allocated. In the figure, reference numerals added to the transmission/reception sequence of messages and the like correspond to the reference numerals in FIG. 4.

When the timer detects any allocation time set according to the hardware resource allocation schedule that has been sent from the hardware resource management unit 3031 by S5, the timer unit 3051 sends an allocation time notification message to the hardware resource management unit 3031. The allocation time notification message includes a resource ID determined in correspondence with the detected allocation time, a timer ID, an allocation type, and a total occupancy (S8).

For example, when the present time reaches 18:00:00, an allocation time notification message is sent to the hardware resource management unit 3031. Next, an allocation time notification message is sent at 18:04:00, and then at 18:04:30. In this way, allocation time notification messages are sequentially sent (see FIG. 9).

On receipt of the allocation time notification message, the hardware resource management unit 3031 calculates an occupancy required for a data processing module whose hardware resource securing state needs to be changed, based on the resource ID, the timer ID, the allocation type, the total occupancy, and the hardware resource utilization schedule. The hardware resource management unit 3031 notifies the hardware resource allocation unit 3061 of the calculated occupancy together with the resource ID, and requests the hardware resource allocation unit 3061 to perform hardware resource allocation for the data processing module (S9: HARDWARE RESOURCE ALLOCATION REQUEST). The processing executed by the hardware resource management unit 3031 on receipt of the allocation time notification message (hereafter referred to as a "timer responsive process") will be explained in detail later.

On receipt of the request of the hardware resource allocation for the broadcast preparation processing by the control program, the hardware resource management unit 3031 requests the hardware resource allocation unit 3061 to perform the requested hardware resource allocation. Note that the amount of the hardware resource to be allocated changes dynamically by the timer responsive process performed every time when the allocation time notification message is received. Every time the allocation time notification message is received, the hardware resource allocation unit 3061 is controlled to perform hardware resource allocation for reproduction processing with priority. Following this, the remaining amount of the hardware resource is re-calculated, that is, the available amount of the hardware resource is re-calculated, and the hardware resource is re-allocated to the broadcast preparation processing within the range of the re-calculated available amount.

On receipt of the hardware resource allocation request, the hardware resource allocation unit 3061 specifies a hardware resource to be allocated using a received resource ID, and sets an occupancy or the like to the specified hardware resource, to obtain a response value or the like. In this way, the hardware resource allocation unit 3061 allocates a certain amount of the hardware resource to the data processing module (S10: HARDWARE RESOURCE ALLOCATION PROCESS). The hardware resource allocation unit 3061 then sends a hardware resource allocation success/failure notice message including information as to whether the allocation has been succeeded, or an error or the like has occurred, to the hardware resource management unit 3031 (S11). When the received message shows that the allocation type is "Out", the hardware resource allocation unit 3061 releases the amount of the hardware resource that has been allocated for the allocation type "In".

On receipt of the allocation time notification message, the hardware resource management unit 3031 performs the timer responsive process which will be explained in detail later. When the received message shows that the allocation type is "In", the hardware resource management unit 3031, which has received the hardware resource allocation request success/failure notice message indicating "success", executes the data processing module by the control program targeting material data such as video specified by the timer ID specified by the allocation time notification message. This results in the video data being reproduced by the control program. Note that the hardware resource management unit 3031 includes a timer ID that is identical to the timer ID corresponding to the executed data processing module. On receipt of the allocation time detection message indicating that the allocation type is "Out", the hardware resource management unit 3031 suspends the execution of the data processing module.

The allocation of the local HDD band 1201 for data transfer is executed as follows. A material ID for identifying a data processing module and an occupancy showing a bandwidth to be allocated are set to the driver of the SCSI card 2012 included in the OS. On receipt of this setting, the data processing module involving reading of video data specified by the material ID from a hard disc by the control program is executed under the control of the hardware resource management unit 3031. Then, the driver allocates the bandwidth of the set occupancy to the data processing module. Following this, the video data is read from the hard disc and sent to the transmitting device 1601 utilizing the allocated bandwidth.

In more detail, the allocation of the local HDD band 1201 based on the editing list 5001 is performed as follows. The hardware resource allocation unit 3061 sets that video data with a material ID "CUT1" starts to be transferred at 18:00:00 using a bandwidth of 60 Mbps, and that video data with a material ID "CUT2" starts to be transferred at 18:04:00 using a bandwidth of 60 Mbps. Also, the hardware resource allocation unit 3061 cancels the transfer setting of the video data with the material ID "CUT1", at 18:04:30.

For other hardware resources required for reproduction based on the editing list 5001, the hardware resource management unit 3031 generates a hardware resource utilization schedule and a hardware resource allocation schedule in the same way as for the local HDD band 1201 described above, and requests the hardware resource allocation unit 3061 to perform hardware resource allocation on receipt of an allocation time notification message.

In this way, the nonlinear editing device dynamically allocates a minimum amount of a hardware resource to reproduction of a program based on the editing list 5001, and executes data transfer for the reproduction utilizing the allocated amount of the hardware resource. As a result of this, video data or the like for the program is sent to the transmitting device 1601 via the CODEC card 2032, the AV switcher 1501, and eventually is broadcasted.

Note that when a plurality of sets of video data are read in parallel from the local HDD 1201 and broadcasted, each set of video data may be regarded as one object for constituting a screen, and may be subjected to MPEG-4 Visual Coding before being broadcasted.

Figure 13:
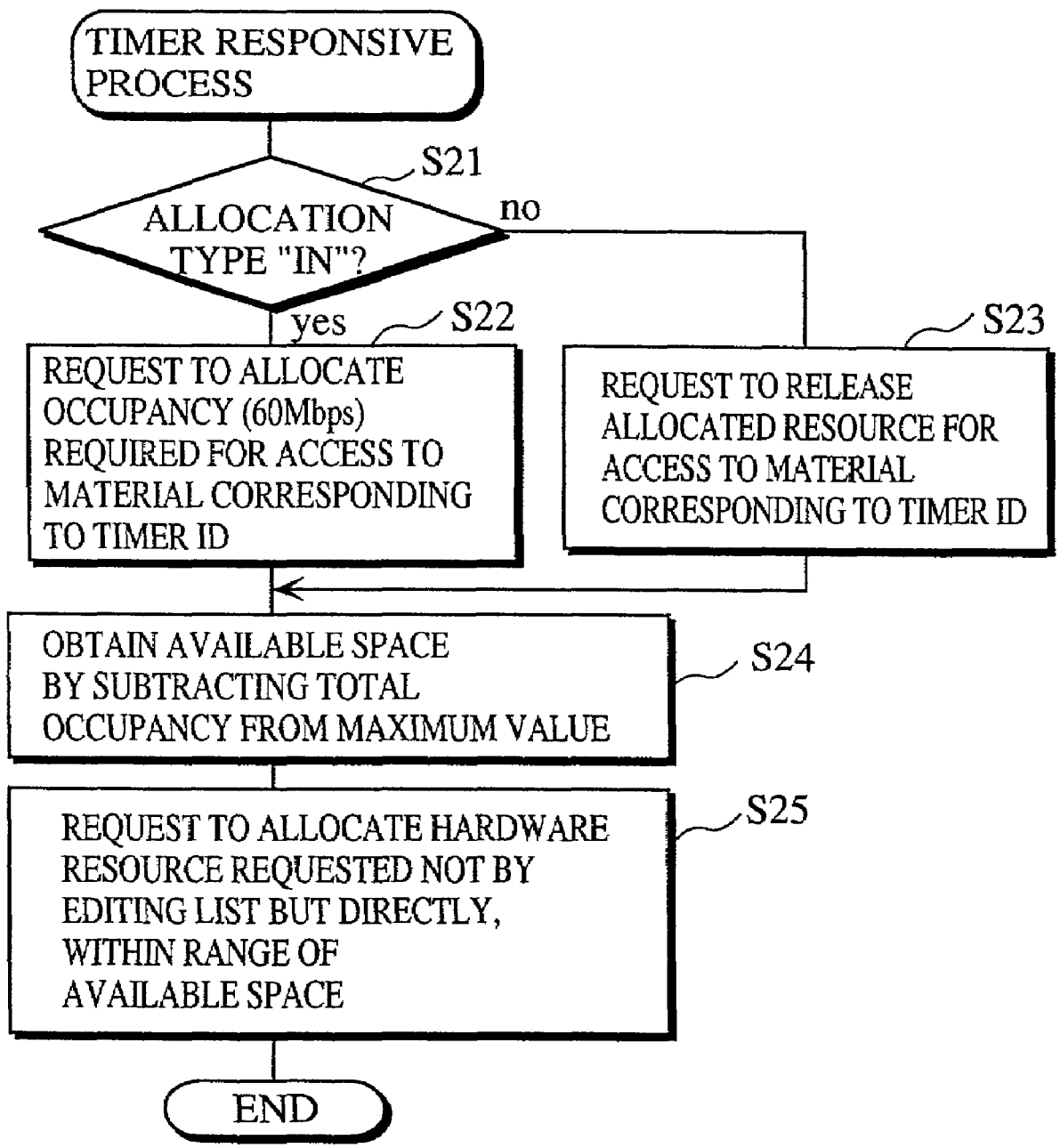
FIG. 13 is a flowchart showing a timer responsive process.

FIG. 13 is a flowchart showing the timer responsive process.

On receipt of an allocation time notification message including a resource ID, a timer ID, an allocation type, and a total occupancy, the hardware resource management unit 3031 judges whether the allocation type shows a value indicating "In" (step S21). When the judgment result in step S21 is affirmative, the hardware resource management unit 3031 obtains an occupancy of the hardware resource utilized for an access to material data associated with the timer ID, by referring to the hardware resource utilization schedule in the hardware resource management DB 3041, and requests the hardware resource allocation unit 3061 to allocate the obtained occupancy to the access to the identified material data (step S22).

For example, when an allocation time notification message is received at 18:00:00, the hardware resource management unit 3031 requests the hardware resource allocation unit 3061 to allocate a bandwidth of 60 Mbps shown by the occupancy in the hardware resource utilization schedule, to the data processing module involving video data transfer whose timer ID, or material ID, is "CUT1".

Also, when the allocation type is judged to be "Out" in step S21, the hardware resource management unit 3031 requests the hardware resource allocation unit 3061 to release the amount of the hardware resource that has already been allocated to the data processing module involving the video data transfer associated with the timer ID (step S23).

After either steps S22 or S23, the hardware resource management unit 3031 calculates an available amount of the hardware resource by subtracting the total occupancy from the maximum value in the hardware resource utilization schedule (step S24). The available amount of the hardware resource means an amount of the hardware resource remaining after the hardware resource allocation has been performed for the video data reproduction with priority based on the editing list.

After the calculation of the available amount of the hardware resource, if the control program directly requests hardware resource allocation without being based on the editing list, that is, the control program requests hardware resource allocation for broadcast preparation processing, the hardware resource management unit 3031 requests the hardware resource allocation unit 3061 to perform hardware resource allocation by fully utilizing the calculated available amount (step S25). The timer responsive process ends.

As one example, when video data with a material ID "CUT10" is edited by the control program in accordance with the program editor's indication, the control program directly requests the hardware resource management unit 3031 to perform hardware resource allocation. In response to this, the hardware resource management unit 3031 refers to the hardware resource utilization schedule, to calculate a presently available amount of the hardware resource, and requests the hardware resource allocation unit 3061 to perform hardware resource allocation within the range of the calculated available amount.

In this way, the amount of the hardware resource once allocated in response to the direct request can be changed based on the request given in step S25. This enables an amount of each hardware resource remaining after a certain amount of the hardware resource has been secured for video data transfer for broadcast, to be utilized efficiently for broadcast preparation processing, that is, processing with less urgency. Accordingly, even the processing with less urgency can be executed as promptly as possible, thereby enabling the utilization efficiency of the hardware resources to be improved.

<Considerations>

Figure 14:
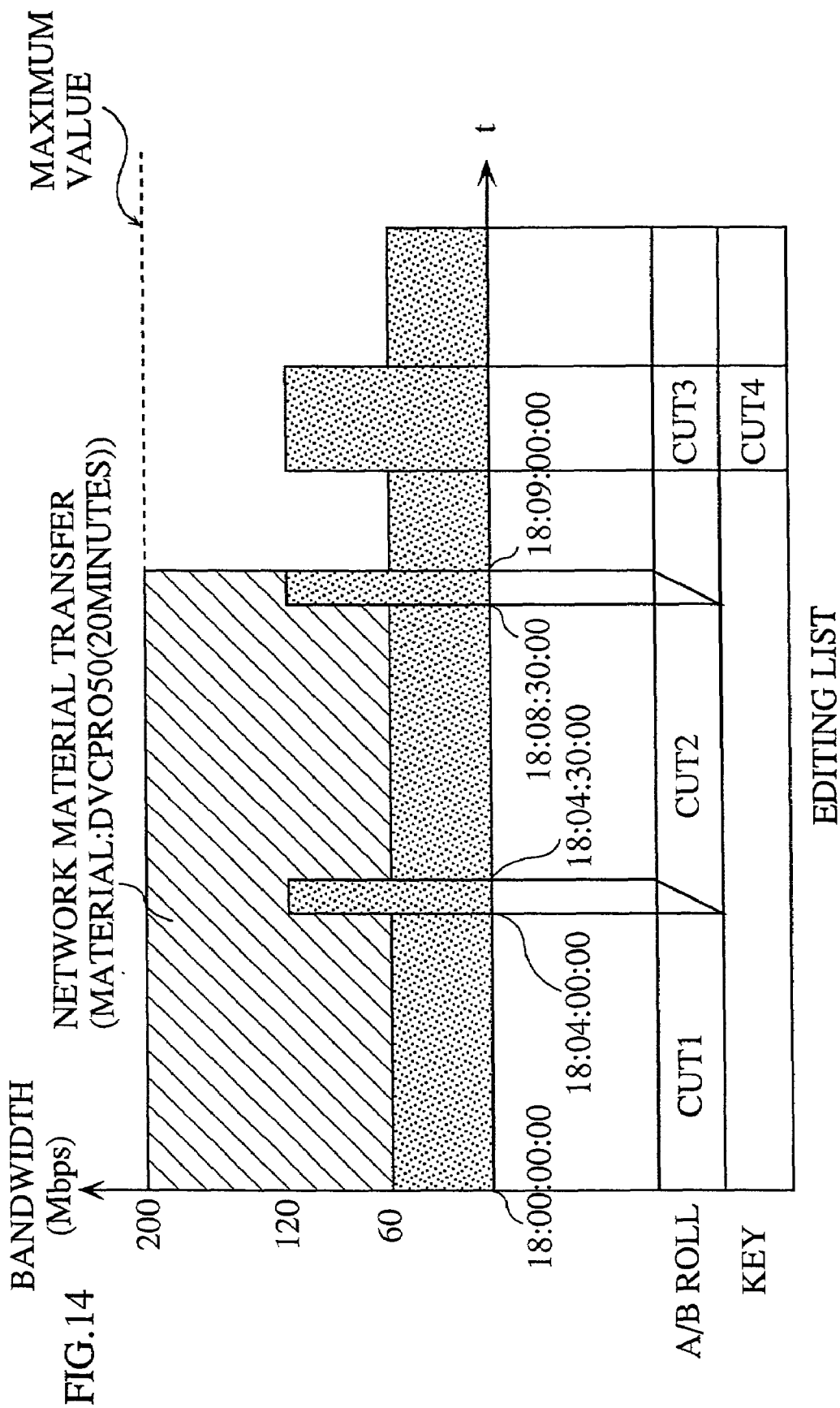
FIG. 14 shows a temporal change of a bandwidth utilized for an access to a local HDD 1201, when video data transfer for broadcast based on an editing list 5001 and net work material transfer are executed in parallel.
Figure 15:
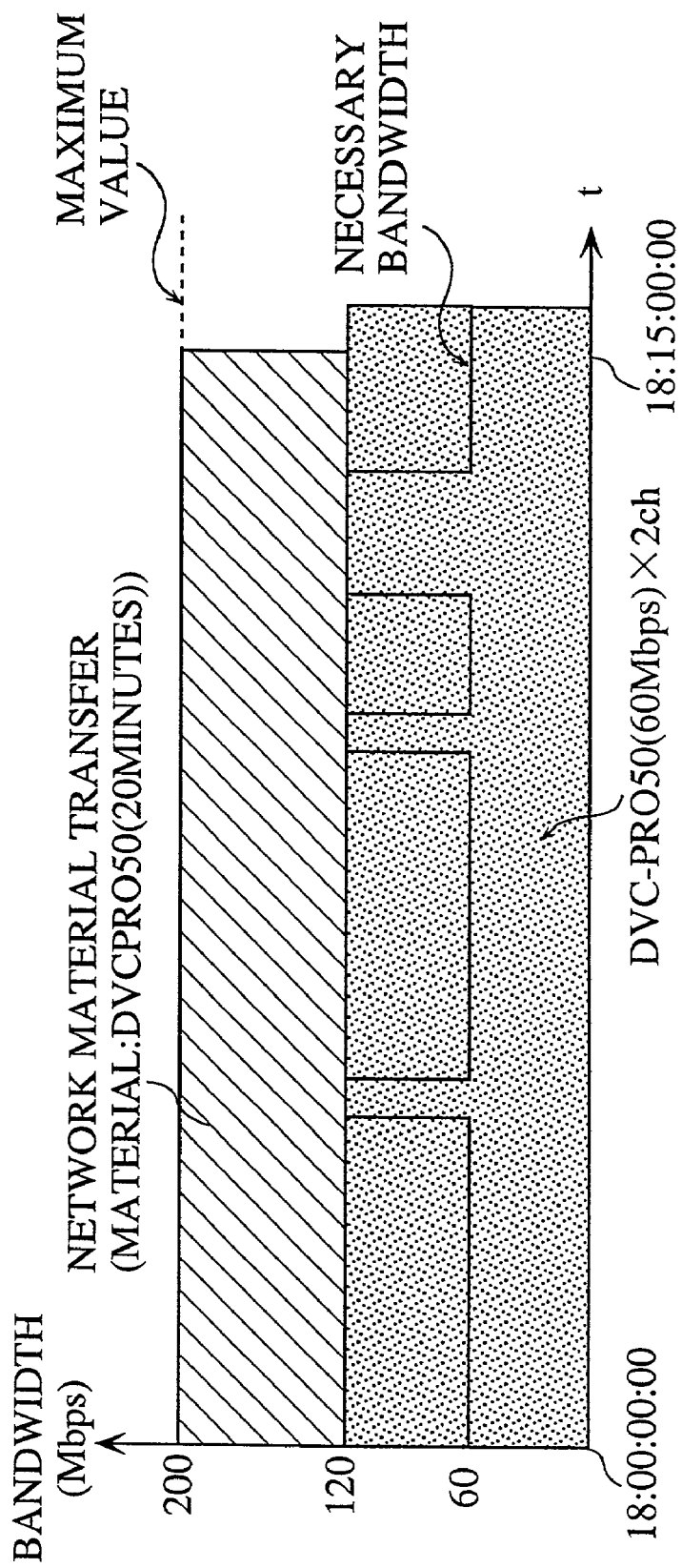
FIG. 15 shows a temporal change of a bandwidth utilized for an access to the local HDD 1201, assuming that video data transfer for broadcast and network material transfer are executed in parallel according to a conventional technique.

The following describes the effects produced by the present embodiment relating to an access to the local HDD 1201, with reference to FIGS. 14 and 15.

FIG. 14 shows a temporal change of a bandwidth utilized for an access to the local HDD 1201 when video data transfer in reproduction processing for broadcast and network material transfer are executed in parallel.

The network material transfer is for transferring a material such as video data and audio data from the material server 1401 to the local HDD 1201. Here, video data of 20 minutes in the DVCPRO50 format is taken as example.

As shown in the figure, the network material transfer starts at 18:00:00, and is being executed using a bandwidth of 140 Mbps until 18:04:00, using a bandwidth of 80 Mbps from 18:04:00 to 18:04:30, using a bandwidth of 140 Mbps from 18:04:30 to 18:08:30, using a bandwidth of 80 Mbps from 18:08:30 to 18:09:00, and is completed at 18:09:00.

Accordingly, after 18:09:00, an editing operation of the transferred material, or network transfer of another material can be executed.

On the contrary, FIG. 15 shows a temporal change of a bandwidth utilized for an access to the local HDD 1201, assuming that video data transfer for broadcast and network material transfer are executed in parallel according to a conventional technique.

The network material transfer of video of 20 minutes in the DVCPRO50 format is taken as example as in FIG. 14.

Conventionally, an enough bandwidth to transfer two sets of video data, more specifically, a bandwidth of 120 Mbps, has been secured in advance to prevent broadcast accidents from happening. In this case, the network material transfer starts at 18:00:00, and is being executed using a bandwidth of 80 Mbps until 18:15:00, and is completed at 18:15:00 as shown in the figure. The hardware resource is being occupied for six minutes longer, compared with the case of the present embodiment shown in FIG. 14.

As described above, the present embodiment enables the hardware resources to be utilized efficiently, and network material transfer to be executed promptly even during data transfer for broadcast. Therefore, the program editor can initiates, for example, an editing operation of the transferred material promptly.

<Supplementary Explanations>

Although the nonlinear broadcast system relating to the present invention has been described based on the above embodiment, the invention should not be limited to such. For instance, the following modifications are possible.

(1) Although the present embodiment describes the network 1301 as the Gigabit Ethernet, it may be other networks, such as SDTI (Serial Digital Transport Interface), Fibre Channel, and ATM (Asynchronous Transmission Mode). Also, although the present embodiment describes the case where the CODEC card for the VTR and the video camera, and the CODEC card for the transmitting device are separately provided, one CODEC card may instead be provided for both of these purposes.

Also, the present embodiment describes the case where two tracks, namely, the A/B roll track and the KEY track, are provided, a plurality of A/B roll tracks and KEY tracks may be provided, and a track for audio may also be provided. Also, the editing list may include information relating to a reproduction start time and a reproduction end time not only for video data but also for audio data.

(2) Although the present embodiment describes the case where video data to be broadcasted is stored in the local HDD, a recording medium for such video data should not be limited to a hard disc. Any other recording medium such as an optical disc or the like may be used as long as it is a randomly accessible recording medium.

(3) The present embodiment describes the case where the hardware resource management unit 3031 performs, when requested to perform hardware resource allocation for broadcast preparation processing by the control program, the hardware resource allocation for the broadcast preparation processing in accordance with the given request, within a range of an available amount of a hardware resource remaining after a certain amount of the hardware resource has been secured for data transfer for reproduction processing. In this hardware resource allocation, the hardware resource management unit 3031 fully utilizes the remaining amount of the hardware resource. Here, in a case where there are a plurality of control programs each requesting hardware resource allocation for broadcast preparation processing, the resource allocation for the broadcast preparation processing requested by each control program may be performed within a range of an available amount of a hardware resource according to a certain priority. Alternatively, the resource allocation may be performed in such a manner that the available amount of the hardware resource is uniformly divided by the number of the broadcast preparation processings, and the resulting amount is allocated uniformly to each broadcast preparation processing. Also, the resource allocation may be performed based on any other rules.

In the case where the control program that requests hardware resource allocation not by the editing list but directly, that is, the control program that requests hardware resource allocation for broadcast preparation processing, specifies a minimum required amount of the hardware resource, the hardware resource allocation fully utilizing the available amount of the hardware resource by the hardware resource management unit 3031 may be performed only for a duration where the available amount of the hardware resource exceeds the required minimum amount. As one example of this, the following describes hardware resource allocation when a control program that executes SDTI transfer requiring a minimum bandwidth of 120 Mbps as a background job directly requests the hardware resource management unit 3031 to perform the hardware resource allocation.

Figure 16:
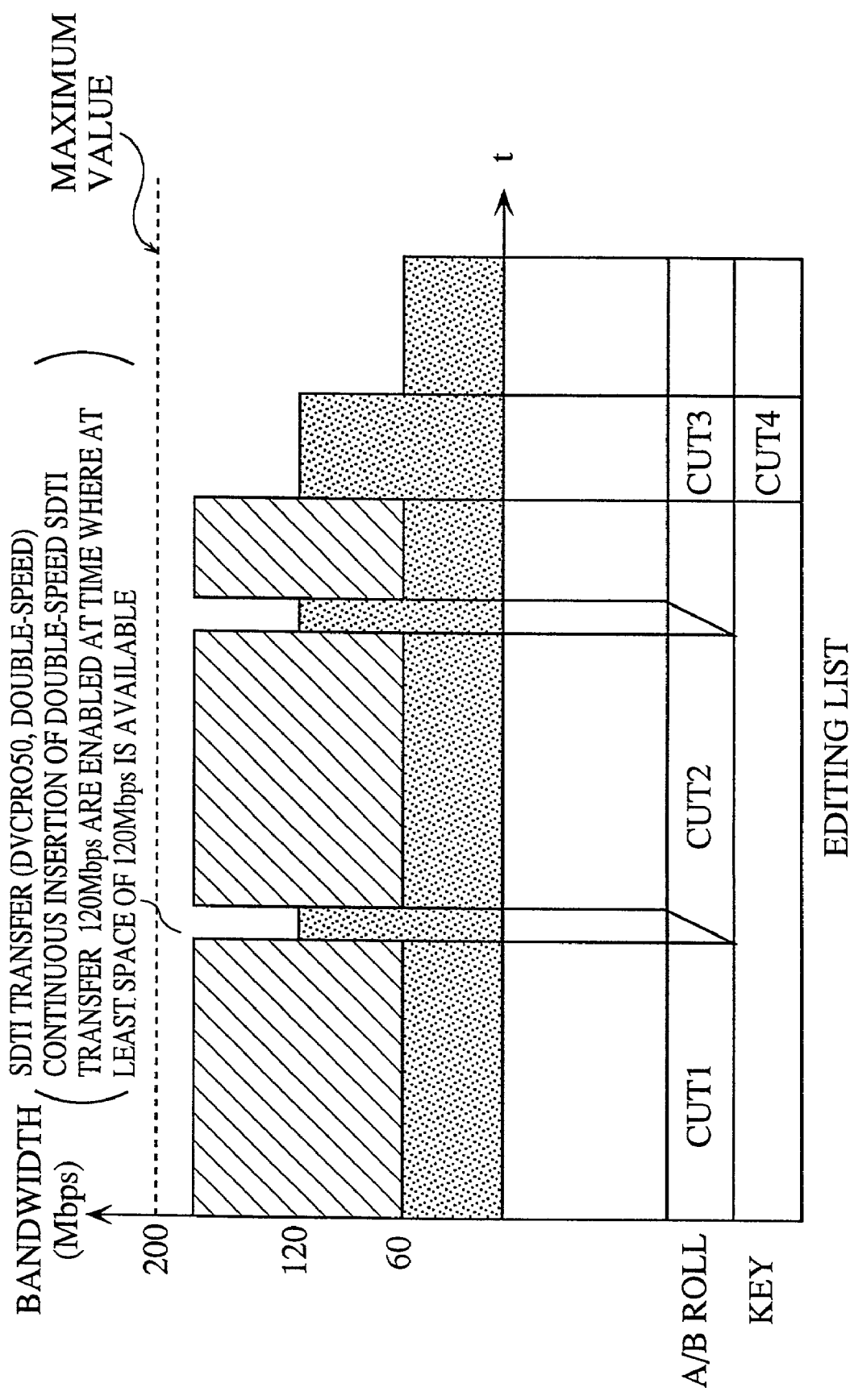
FIG. 16 shows a temporal change of a bandwidth utilized for an access to the local HDD 1201, when video data transfer for broadcast based on an editing list 5001, network material transfer, and SDTI transfer (a double-speed transfer of DVCPRO50) are executed in parallel.

FIG. 16 shows a temporal change of a bandwidth utilized for an access to the local HDD 1201 when video data transfer for broadcast based on an editing list 5001, network material transfer, and SDTI transfer (a double-speed transfer of DVCPRO50) are executed in parallel.

In the SDTI transfer, data transfer needs to be executed with securing a certain bandwidth. For a double-speed transfer of data in the DVCPRO50 format, a bandwidth of 120 Mbps is required. The following describes control over the hardware resource allocation unit 3061 when the maximum bandwidth is 200 Mbps as shown in FIG. 16. In a duration where a bandwidth of 60 Mbps is utilized for data transfer based on the editing list, an available hardware resource of 120 Mbps may be allocated to the SDTI transfer. In a duration where a bandwidth of 120 Mbps is utilized for data transfer for reproduction processing based on the editing list, an available amount of the hardware resource is insufficient, and so it may not be allocated to the SDTI transfer. Due to this, the SDTI transfer can be executed intermittently as a background job even during broadcast based on the editing list 5001.

(4) The present embodiment describes the case where the material ID in the editing list may be a file name of video data as one example. However, the material ID may instead be an identifier added to information specifying a certain range in a certain video data file. To be more specific, a material ID, such as "CUT1" and "CUT2", may simply identify data to be processed as one data processing module, such as reproduction processing. In addition, the material ID may be associated with processing target specification information that shows a range of data in a video data file. In this case, the processing target specification information may be referred to by the control program when executing the data processing module.

Also, when processing targets identified by a plurality of material IDs such as "CUT1" and "CUT2" indicate the same range of data in the same video data file, the driver of the SCSI card 2012 may store the targeted data that has been read from the hard disc into a cache memory. The data stored in the cache memory can be read when the same data is required for the second time. In other words, a technique of a typical disc cache maybe applied. In this case, the hardware resource management unit 3031 exclude information relating to a material ID that indicates the same range of video data as already reproduced from the hardware resource utilization schedule for the local HDD band. Based on the hardware resource utilization schedule generated in this way, allocation time detection and calculation of an available amount of a hardware resource may be performed.

(5) The driver of the SCSI card 2012 described in the present embodiment may allocate a predetermined bandwidth to each data processing module by obtaining an identifier for the data processing module, and execute data transfer. Alternatively, the driver may obtain an identifier of each transfer target file, and allocate a predetermined bandwidth for each access to the transfer target file based on the obtained identifier and execute data transfer. Also, the control program may notify the driver of the identifier of the data processing module or the identifier of the target data when a request to access the hard disc is given.

(6) The above embodiment describes the case where the timer unit 3051 sends an allocation time notification message to the hardware resource management unit 3031 at the time based on the hardware resource utilization schedule, and on receipt of every allocation time notification message, the hardware resource management unit 3031 calculates an available amount of a hardware resource, and re-allocates the hardware resource to broadcast preparation processing. However, the timer unit 3051 may perform allocation time detection, or issue an allocation time notification message, at a time a short duration, say, 0.2 seconds, before the determined time. The short duration here corresponds to a time taken to prepare for an access to video data in the hard disc. Accordingly, the calculation for the available amount of the hardware resource is performed prior to the time of the In-point. This means that the amount of the hardware resource that can be allocated to broadcast preparation processing can be obtained shortly before the In-point. In such a case where a part of the hard disc is accessed only for a short time period to prepare for the access to the video data, like when address information for the video data is obtained, the access performed during the time period is not interrupted by the broadcast preparation processing. As a result, an access to video data based on the editing list after the time shown by the In-point can be ensured.

(7) For broadcast preparation processing described in the present embodiment, the hardware resource management unit 3031 performs hardware resource allocation within a range of an amount of a hardware resource remaining after a certain amount of the hardware resource has been allocated to reproduction processing. Here, the hardware resource management unit 3031 may perform control so as to display such information on a monitor that indicates when the broadcast preparation processing is completed, based on the amount of the hardware resource allocated to the broadcast preparation processing. To be more specific, if the hardware resource management unit 3031 is requested to perform hardware resource allocation for an access to the hard disc with specifying a data transfer amount of broadcast preparation processing, the hardware resource management unit 3031 can calculate the time at which the specified data transfer is to be completed, and perform the control to display the calculated time on the monitor.

In this case, it should be noted that the hardware resource management unit 3031 is required to update information to be displayed on the monitor every time when an available amount of each hardware resource changes.

Figure 17:
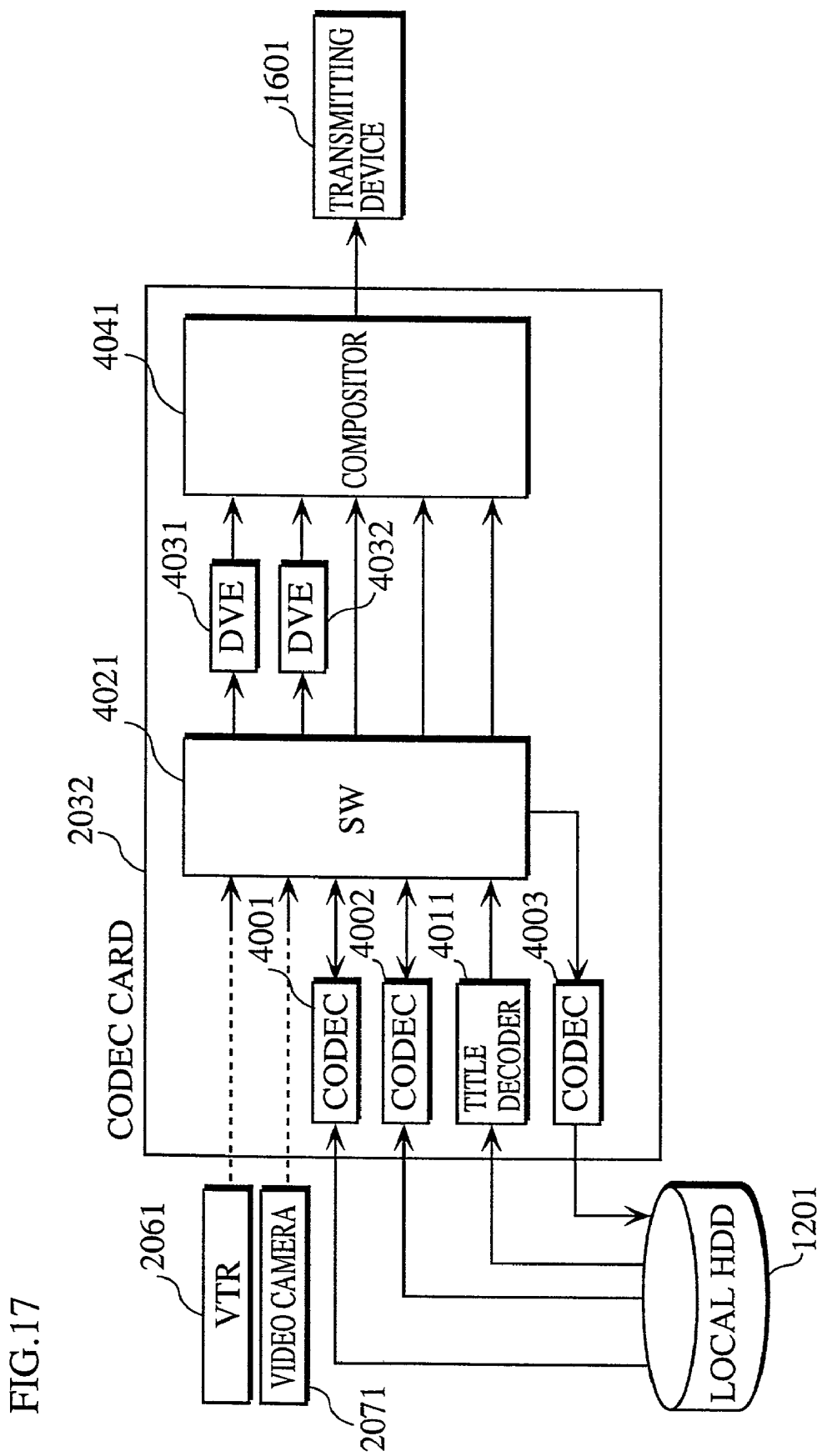
FIG. 17 shows a modified example of the CODEC card 2032 shown in FIG. 3.

(8) The CODEC card 2032 shown in FIG. 3 in the present embodiment may be constructed as in FIG. 17 with a CODEC 4003 being additionally provided.

This construction enables a live video from the video camera 2071 to be recorded onto the local HDD 1201 via the CODEC 4003 during transmission performed by the transmitting device 1601. Accordingly, while broadcasting a live video, scenes recorded on the local HDD can be edited. Taking a baseball program broadcast as example, a live video transmitted from a field is being broadcasted, while a specific scene desired by audiences, such as a home-run scene can be edited and broadcasted promptly.

Also, the DVEs 4031 and 4032 in the CODEC card 2032 can be set in advance to give an effect to video data at a specified time before its reproduction. In addition, the DVEs 4031 and 4032 may be set in real time to give an effect to video data during the reproduction of the video data (hereafter referred to as "on-the-fly editing"). The nonlinear editing device 1101 or the like may be provided with a control program for on-the-fly editing.

Figure 18:
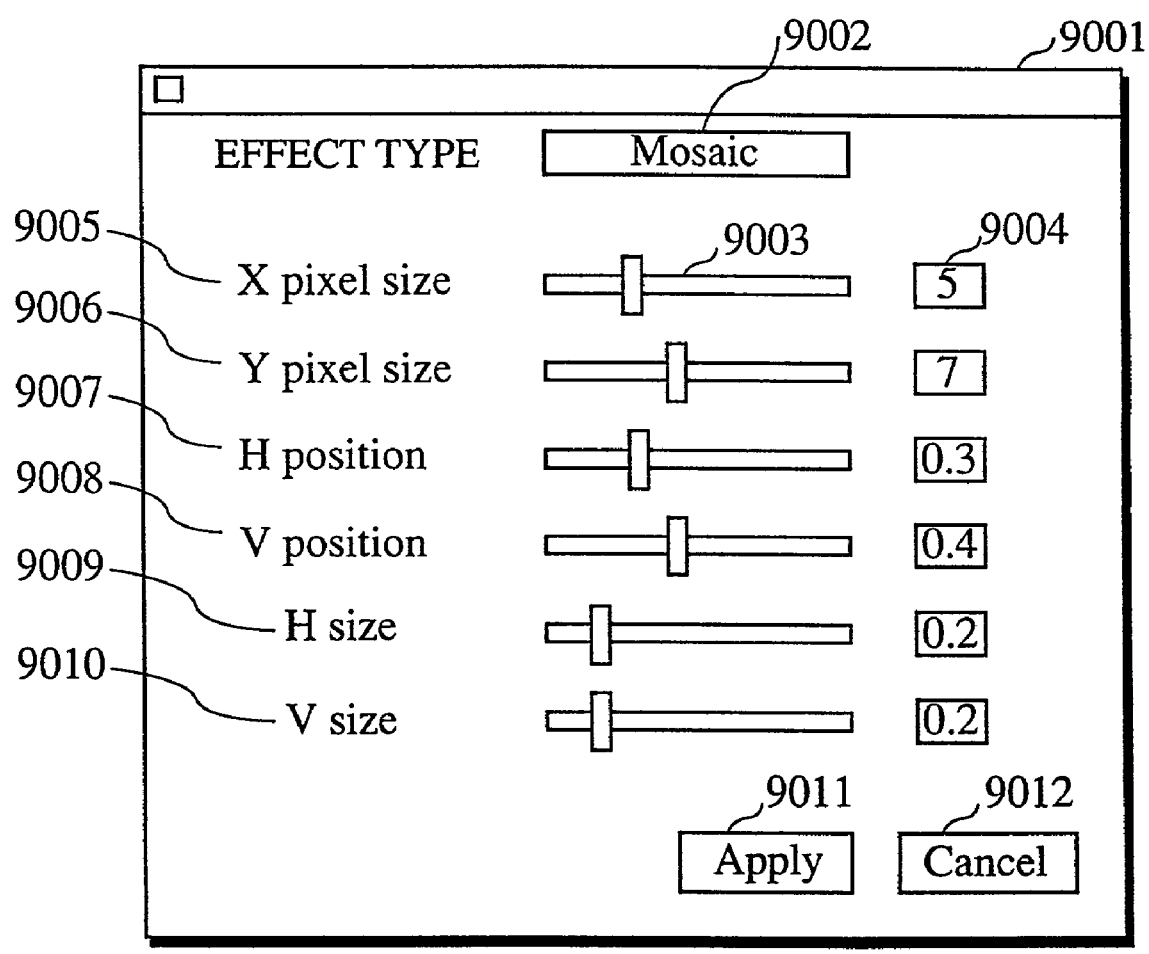
FIG. 18 shows a GUI screen 9001 for on-the-fly editing displayed by an application program for on-the-fly editing.

FIG. 18 shows a GUI screen 9001 for on-the-fly editing displayed by the control program for on-the-fly editing. In the figure, the GUI screen 9001 indicates the case where mosaic is selected as a type of an effect to be given to the video data as one example.

The GUI screen 9001 for on-the-fly editing is composed of a setting box 9002 for determining an effect type for on-the-fly editing, a slider bar 9003 for setting each attribute value of the effect, an input box 9004 for inputting each set value, effect attributes 9005 to 9010, an "apply" button 9011 for applying the effect by on-the-fly editing, and a "cancel" button 9012 for canceling the on-the-fly editing.

Here, the "X pixel size" 9005 and the "Y pixel size" 9006 are respectively for setting a horizontal size and a vertical size of one point of a mosaic. The "H position" 9007 and the "V position" 9008 are respectively for setting horizontal and vertical central points for the mosaic. A value "0" indicates a left end and a top end, and a value "1" indicates a right end and a bottom end. The "H size" 9009 and the "V size" 9010 are respectively for setting a horizontal size and a vertical size of the entire mosaic. A value "1" indicates the same size as the original video. When the "apply" button 9011 is pressed by the program editor, the effect starts to be given. The effect continues to be given until the "cancel" button 9012 is pressed. Also, once the "apply" button 9011 is pressed, a change in each attribute value of the slider bar 9003 and the input box 9004 is immediately reflected on the effect.

Accordingly, the use of an application for on-the-fly-editing described above enables an effect intended by the program editor to be added in real time while a live video is directly being broadcasted in a news program. To be more specific, a procedure for once storing a program material to which the effect is added into a local HDD and the like before broadcasting the program material becomes unnecessary, thereby enabling the program to be broadcasted while an effect are being added.

(9) In the present embodiment, priority is given to hardware resource allocation for transfer processing directly required for broadcast, that is, processing such as reading material data from a recording medium, with less priority being given to broadcast preparation processing such as writing material data to the recording medium for editing and accessing once stored material data.

This allocation method can also be applied to hardware resource allocation with a higher priority being given to streaming type delivery processing, than to download type delivery processing. To be more specific, a certain bandwidth utilized for an access to the recording medium, or a transmission bandwidth may be allocated to the streaming type delivery processing, and the remaining bandwidth may be allocated to the download type delivery processing fully utilizing the remaining amount of the hardware resource. The streaming type delivery referred to herein means a broadcast type for organizing a plurality of sets of material data such as video and audio so as to be in the MPEG-2 transport stream format or the like and broadcasting the sets of material data, so that the broadcast reception device can reproduce the sets of material data in real time upon receipt of them. The streaming type delivery cannot afford to allow a delay or an interruption during broadcast. The download type delivery referred to herein means a broadcast type for organizing a plurality of sets of material data such as video and audio so as to be in a format suitable for download and delivering the sets of material data to a broadcast reception device that has the function of storing downloaded data into a recording medium such as a hard disc and reproducing the data any time later. The delivery to the broadcast reception device is made via storing the data in a delivery server.

(10) A computer program that makes computer execute the operation procedures of the editing list management unit 3021, the hardware resource management unit 3031, the timer unit 3051, and the hardware resource management unit 3061 of the nonlinear editing device 1101 (including the operation procedures shown in FIGS. 10 to 13) may be commercialized and distributed, by recording the computer program onto a recording medium, or via various communication channels. The recording medium may be an IC card, a magneto-optic disc, a flexible disc, and a ROM. The computer program commercialized and distributed is utilized by installing it on a computer. The computer realizes the allocation control relating to the hardware resource management described above by executing the computer program.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A nonlinear broadcast system that broadcasts material data by executing a plurality of transfer processes of the material data for broadcast in parallel for at least a certain duration, the transfer processes for broadcast utilizing a common hardware resource, the nonlinear broadcast system comprising:

material storage means that is a recording medium storing a video data file including material data;

cache means that is a memory temporarily storing the material data read from the recording medium;

processing target specification information storage means storing processing target specification information that specifies which range in a video data file is indicated by the material data that is a processing target of each of the plurality of transfer processes;

duration information storage means storing duration information showing durations, in each of which a different one of the transfer processes for broadcast is scheduled to be executed;

first allocation means for allocating a required amount of the hardware resource to each transfer process for broadcast based on the processing target specification information, for the corresponding duration shown by the duration information;

available amount calculation means for calculating an available amount of the hardware resource remaining after the first allocation means has allocated the required amount to each transfer process for broadcast;

second allocation means for allocating, to one or more background transfer processes that are processes other than the transfer processes for broadcast, as much amount of the hardware resource as possible, so as not to exceed the calculated available amount; and process execution means for executing (a) each transfer process for broadcast utilizing the amount of hardware resource allocated by the first allocation means, and (b) each background transfer process utilizing the amount of hardware resource allocated by the second allocation means, wherein the hardware resource is a band for an access to the recording medium, when processing targets of the plurality of transfer processes indicate a same range in a same video data file, the first allocation means does not exceptionally allocate the required amount of the hardware resource to one of the plurality of transfer processes executed in a later duration, and the process execution means executes the transfer process to which the required amount of the hardware resource is not exceptionally allocated, by accessing the cache means to read the material data instead of accessing the recording medium.

2. The nonlinear broadcast system of claim 1, wherein the available amount calculation means calculates the available amount of the hardware resource, every time when one of a start time and an end time of each duration shown by the duration information is reached.

3. The nonlinear broadcast system of claim 2, wherein the material storage means is a readable and writable recording medium, the hardware resource is a band for an access to the recording medium, the first allocation means allocates a required bandwidth of the band to each transfer process for broadcast, the available amount calculation means calculates an available bandwidth by subtracting the bandwidth allocated to each transfer process for broadcast by the first allocation means from a total bandwidth of the band for the access to the recording medium, the second allocation means allocates, to each background transfer process, as much bandwidth of the band as possible, so as not to exceed the calculated available bandwidth, and the process execution means executes (a) each transfer process for broadcast utilizing the bandwidth allocated by the first allocation means, and (b) each background transfer process utilizing the bandwidth allocated by the second allocation means.

4. The nonlinear broadcast system of claim 3, wherein each background transfer process is a process for writing the material data to the recording medium, and each transfer process for broadcast is a process for reading the material data from the recording medium.

5. The nonlinear broadcast system of claim 4, wherein the material data is video data, the recording medium is a hard disc, and the nonlinear broadcast system comprises:

a transmitting device for converting the video data so as to be in a broadcast format, and broadcasting the converted video data;

a plurality of nonlinear editing devices each being provided so as to correspond to one hard disc and including a coder-decoder, the first allocation means, the second allocation means, the available amount calculation means, and the process execution means, the process execution means executing each transfer process for broadcast for reading the video data from the hard disc corresponding to the nonlinear editing device and outputting the read video data via the coder-decoder; and a switcher for selecting video data, out of video data outputted by each of the nonlinear editing devices, and sending the selected video data to the transmitting device.

6. The nonlinear broadcast system of claim 5, wherein each nonlinear editing device further includes effect addition means for adding an effect to the video data when the video data is outputted via the coder-decoder.

7. The nonlinear broadcast system of claim 4, further comprising transfer complete time display means for obtaining an amount of data to be transferred by each background transfer process, calculating a time at which the background transfer process is to be completed, based on the bandwidth allocated by the second allocation means, and displaying the calculated time.

8. The nonlinear broadcast system of claim 3, wherein each transfer process for broadcast is a process for reading the material data from the recording medium, organizing the read material data so as to be in a format suitable for a streaming-type delivery, and performing the streaming-type delivery, and each background transfer process is a process for reading the material data from the recording medium, organizing the read material data so as to be in a format suitable for a download-type delivery, and performing the download type delivery.

9. The nonlinear broadcast system of claim 1, wherein the available amount calculation means calculates the available amount, every time when one of (a) a time that is a predetermined duration before a start time of each duration shown by the duration information and (b) an end time of each duration shown by the duration information is reached.

10. A hardware resource allocation method for performing hardware resource allocation for processes, in a nonlinear broadcast system in which material data are broadcasted by executing a plurality of transfer processes of the material data for broadcast in parallel for at least a certain duration, the transfer processes for broadcast utilizing a common hardware resource, the nonlinear broadcast system including material storage means that is a recording medium storing a video data file including the material data, cache means that is a memory temporarily storing the material data read from the recording medium, processing target specification information storage means storing processing target specification information that specifies which range in a video data file is indicated by the material data that is a processing target of each of the plurality of transfer processes, and duration information storage means storing duration information showing durations, in each of which a different one of the transfer processes for broadcast is scheduled to be executed, the hardware resource allocation method comprising:

a first allocation step for allocating a required amount of the hardware resource to each transfer process for broadcast based on the processing target specification information for the corresponding duration shown by the duration information;

an available amount calculation step for calculating an available amount of the hardware resource remaining after the required amount has been allocated to each transfer process for broadcast in the first allocation step; and a second allocation step for allocating, to one or more background transfer processes that are processes other than the transfer processes for broadcast, as much amount of the hardware resource as possible, so as not to exceed the calculated available amount, wherein the nonlinear broadcast system includes process execution means for executing (a) each transfer process for broadcast utilizing the amount of hardware resource allocated by the first allocation step, and (b) each background transfer process utilizing the amount of hardware resource allocated by the second allocation step, the hardware resource is a band for an access to the recording medium, when processing targets of the plurality of transfer processes indicate a same range in a same video data file, the first allocation step does not exceptionally allocate the required amount of the hardware resource to one of the plurality of transfer processes executed in a later duration, and the process execution means executes the transfer process to which the required amount of the hardware resource is not exceptionally allocated, by accessing the cache means to read the material data instead of accessing the recording medium.

11. The hardware resource allocation method of claim 10, wherein in the available amount calculation step, the available amount of the hardware resource is calculated every time when one of a start time and an end time of each duration shown by the duration information is reached.

12. The hardware resource allocation method of claim 11, wherein the material storage means included in the nonlinear broadcast system is a readable and writable recording medium, the hardware resource is a band for an access to the recording medium, in the first allocation step, a required bandwidth of the band is allocated to each transfer process for broadcast, in the available amount calculation step, an available bandwidth is calculated by subtracting the bandwidth allocated to each transfer process for broadcast in the first allocation step from a total bandwidth of the band for the access to the recording medium, and in the second allocation step, as much bandwidth of the band as possible is allocated to each background transfer process, so as not to exceed the calculated available bandwidth.

13. The hardware resource allocation method of claim 12, wherein each background transfer process is a process for writing the material data to the recording medium, and each transfer process for broadcast is a process for reading the material data from the recording medium.

14. The hardware resource allocation method of claim 12, wherein each transfer process for broadcast is a process for reading the material data from the recording medium, organizing the read material data so as to be in a format suitable for a streaming-type delivery, and performing the streaming-type delivery, and each background transfer process is a process for reading the material data from the recording medium, organizing the read material data so as to be in a format suitable for a download-type delivery, and performing the download type delivery.

15. The hardware resource allocation method of claim 10, wherein in the available amount calculation step, the available amount is calculated every time when one of (a) a time that is a predetermined duration before a start time of each duration shown by the duration information and (b) an end time of each duration shown by the duration information is reached.

16. A computer readable medium for storing a program with instructions for making a nonlinear broadcast system that has a program execution function execute a hardware resource allocation control procedure, the nonlinear broadcast system broadcasting material data by executing a plurality of transfer processes of the material data for broadcast in parallel for at least a certain duration, the transfer processes for broadcast utilizing a common hardware resource, the nonlinear broadcast system including material storage means that is a recording medium storing a video data file including the material data, cache means that is a memory temporarily storing the material data read from the recording medium, processing target specification information storage means storing processing target specification information that specifies which range in a video data file is indicated by the material data that is a processing target of each of the plurality of transfer processes, and duration information storage means storing duration information showing durations, in each of which a different one of the transfer processes for broadcast is scheduled to be executed the program instructions, when executed enables, the hardware resource allocation control procedure comprising:

a first allocation step for allocating a required amount of the hardware resource to each transfer process for broadcast for the corresponding duration shown by the duration information;

an available amount calculation step for calculating an available amount of the hardware resource remaining after the required amount has been allocated to each transfer process for broadcast in the first allocation step; and a second allocation step for allocating, to one or more background transfer processes that are processes other than the transfer processes for broadcast, as much amount of the hardware resource as possible, so as not to exceed the calculated available amount, wherein the nonlinear broadcast system includes process execution means for executing (a) each transfer process for broadcast utilizing the amount of hardware resource allocated by the first allocation step, and (b) each background transfer process utilizing the amount of hardware resources allocated by the second allocation step, the hardware resource is a band for an access to the recording medium, when processing targets of the plurality of transfer processes indicate a same range in a same video data file, the first allocation step does not exceptionally allocate the required amount of the hardware resource to one of the plurality of transfer processes executed in a later duration, and the process execution means executes the transfer process to which the required amount of the hardware resource is not exceptionally allocated, by accessing the cache means to read the material data instead of accessing the recording medium.

17. The computer readable medium of claim 16, wherein in the available amount calculation step, the available amount of the hardware resource is calculated every time when one of a start time and an end time of each duration shown by the duration information is reached.

18. The computer readable medium of claim 16, wherein in the available amount calculation step, the available amount is calculated every time when one of (a) a time that is a predetermined duration before a start time of each duration shown by the duration information and (b) an end time of each duration shown by the duration information is reached.

19. The nonlinear broadcast system of claim 1 further comprising a hardware resource allocation schedule including processing target specification information, an allocation type indicating to start reproduction of the processing target specification information, or to end reproduction of the processing target specification information, an allocation time to start reproduction of the processing target specification information, or to end reproduction of the processing target specification information, a resource ID indicating a hardware resource to start reproduction of the processing target specification information, or to end reproduction of the processing target specification information, and a total occupancy indicating a total amount of the hardware resource used after starting reproduction of the processing target specification information, or ending reproduction of the processing target specification information.

20. The nonlinear broadcast system of claim 19 further comprising a hardware resource utilization schedule including processing target specification information, an allocation time to start reproduction of the processing target specification information, an allocation time to end reproduction of the processing target specification information, a duration of the reproduction of the processing target specification information, a resource ID indicating a hardware resource used for reproduction of the processing target specification information, a maximum value indicating the maximum amount of resource available for a hardware specified by the resource ID, and an occupancy indicating an amount of the hardware resource used for reproduction of the processing target specification information.

21. The nonlinear broadcast system of claim 20 further comprising an editing list including processing target specification information, a program identification corresponding to the processing target specification information, track information corresponding to the processing target specification information, an allocation time to start reproduction of the processing target specification information, an allocation time to end reproduction of the processing target specification information, and a duration of the reproduction of the processing target specification information.

* * * * *